United States Patent
Karabinis et al.

(10) Patent No.: US 6,975,582 B1
(45) Date of Patent: Dec. 13, 2005

(54) DUAL MODE SATELLITE/CELLULAR TERMINAL

(75) Inventors: Peter D. Karabinis, Cary, NC (US); Paul W. Dent, Stebag (SE); Sandeep Chennakeshu, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/261,209

(22) Filed: Mar. 3, 1999

Related U.S. Application Data

(63) Continuation of application No. 08/996,153, filed on Dec. 22, 1997, now Pat. No. 5,959,984, which is a continuation of application No. 08/899,389, filed on Jul. 23, 1997, now Pat. No. 6,084,865, which is a continuation of application No. 08/501,575, filed on Jul. 12, 1995, now Pat. No. 5,663,957.

(51) Int. Cl.[7] ............................................. H04J 9/00
(52) U.S. Cl. ...................... 370/204; 370/206; 370/316; 370/321; 370/337; 370/347; 375/298; 375/305; 375/308; 375/329
(58) Field of Search ............................... 370/285, 315, 370/316, 317, 318, 319, 320, 321, 335, 337, 370/342, 347, 204, 206, 465, 250; 375/211, 375/295, 296, 305, 308, 316, 329, 326, 297, 375/298

(56) References Cited

U.S. PATENT DOCUMENTS

| | | | |
|---|---|---|---|
| 3,852,750 A * | 12/1974 | Klein .......................... 342/396 |
| 4,145,573 A | 3/1979 | Arnold ........................ 370/347 |
| 4,447,903 A | 5/1984 | Sewerinson ................ 371/68.2 |
| 4,532,636 A | 7/1985 | Wilkinson .................. 375/200 |
| 4,817,094 A | 3/1989 | Lebizay et al. ............ 371/68.2 |
| 5,048,059 A | 9/1991 | Dent ........................... 375/340 |
| 5,073,900 A | 12/1991 | Mallinckrodt ............... 375/205 |
| 5,095,288 A | 3/1992 | Dent ............................ 331/17 |
| 5,129,095 A | 7/1992 | Davis et al. ................ 455/12.1 |
| 5,180,993 A | 1/1993 | Dent ............................ 331/16 |
| 5,187,805 A | 2/1993 | Bertiger et al. ............ 455/12.1 |
| 5,361,404 A | 11/1994 | Dent ........................... 455/135 |
| 5,377,229 A * | 12/1994 | Wilson et al. ................. 375/9 |

(Continued)

FOREIGN PATENT DOCUMENTS

EP 275 118 7/1988

(Continued)

OTHER PUBLICATIONS

Russell J. F. Fang, "Quaternary Transmission Over Satellite Channels with Cascaded Nonlinear Elements and Adjacent Channel Interference," IEEE Transactions on Communication, vol. Com-29, No. 5 (May 1981): 567-581.*

(Continued)

*Primary Examiner*—Dang Ton
*Assistant Examiner*—Shick Hom
(74) *Attorney, Agent, or Firm*—Coats & Bennett, P.L.L.C.

(57) ABSTRACT

A method and apparatus of communicating information using Time Division Multiple Access and adaptive transmission and reception are disclosed. Signal bursts are transmitted from TDMA transmitters to a TDMA receiver wherein the transmitter codes the information and transmits coded information to the receiver using at least one of two timeslots of a plurality of timeslots in a repetitive TDMA frame period. Both of the two timeslots are received whether or not the transmitter has transmitted using one or two timeslots and the received signals are classified as intended and non-intended. Successively received signals classified as intended are then assembled into a block for decoding to reproduce the information.

14 Claims, 16 Drawing Sheets

U.S. PATENT DOCUMENTS

| | | | |
|---|---|---|---|
| 5,398,247 A | | 3/1995 | Delprat et al. .............. 370/348 |
| 5,404,376 A | | 4/1995 | Dent .......................... 375/200 |
| 5,448,593 A | | 9/1995 | Hill ............................ 375/267 |
| 5,473,637 A | * | 12/1995 | Gardner ...................... 375/329 |
| 5,491,837 A | | 2/1996 | Haartsen ..................... 370/337 |
| 5,506,863 A | * | 4/1996 | Meidan et al. .............. 375/202 |
| 5,535,432 A | * | 7/1996 | Dent ............................ 455/77 |
| 5,539,730 A | | 7/1996 | Dent .......................... 370/330 |
| 5,546,420 A | | 8/1996 | Seshadri et al. ............ 370/342 |
| 5,548,253 A | * | 8/1996 | Durrant ...................... 375/296 |
| 5,619,507 A | * | 4/1997 | Tsuda ......................... 370/350 |
| 5,663,957 A | * | 9/1997 | Dent .......................... 370/347 |
| 5,691,974 A | | 11/1997 | Zehavi et al. ............... 370/479 |
| 5,710,768 A | * | 1/1998 | Ziv et al. .................... 370/342 |
| 5,729,538 A | | 3/1998 | Dent .......................... 370/347 |
| 5,754,536 A | | 5/1998 | Schmidt ..................... 455/452 |
| 5,754,961 A | * | 5/1998 | Serizawa et al. ........... 455/517 |
| 5,757,787 A | | 5/1998 | Dent .......................... 370/330 |
| 5,757,789 A | | 5/1998 | Dent .......................... 370/370 |
| 5,771,229 A | | 6/1998 | Gauridovich ............... 370/536 |
| 5,774,788 A | * | 6/1998 | Hannah et al. ............. 455/112 |
| 5,812,539 A | | 9/1998 | Dent .......................... 370/321 |
| 5,812,968 A | | 9/1998 | Hassan et al. .............. 704/221 |
| 5,959,984 A | * | 9/1999 | Dent .......................... 370/347 |
| 6,084,865 A | * | 7/2000 | Dent .......................... 370/321 |

FOREIGN PATENT DOCUMENTS

| | | |
|---|---|---|
| EP | 560 388 | 9/1993 |
| EP | 627 827 | 12/1994 |
| GB | 2 103 052 | 2/1983 |
| WO | WO95/07578 | 3/1995 |
| WO | WO95/28814 | 10/1995 |

OTHER PUBLICATIONS

P. S. Mundra, T. L. Signal, and R. Kapur, "The Choice of a Digital Modulation Scheme in a Modile Radio System," paper in Vehicular Technology Conference, 1993, IEEE 43rd.*

U.S. Appl. No. 08/305,780, issued as U.S. Patent No. 5,535,432 on Jul. 5, 1996.

U.S. Appl. No. 07/585,910, abandoned in favor of Continuation Application U.S. Appl. No. 08/061,038, issued as U.S. Patent No. 5,361,404 on Nov. 1, 1994.

Del Re et al., "The GSM Procedures in an Integrated Cellular/Satellite System," *IEEE Journal on Selected Areas in Communications*, vol. 13, No. 2, Feb. 1995, pp. 421-430.

Priscoli, "Network Aspects Relevant to the Integration Between the GSM Network and a Satellite System," *International Conference on Universal Personal Communications*, Vo. CONF. 2, Oct. 1993, pp. 339-343.

Del Re et al., "Issues on the Protocol Definition for an Integrated Space/Terrestrial Mobile Communication System," *European Conference on Satellite Communications*, No. CONF. Nov. 1993, pp. 21-23.

Priscoli et al., "Study on the Integration Between the GSM Cellular Network and a Satellite System," *Proceedings of the Global Telecommunications Conference*, vol. 1, Nov. 1993, pp. 588-592.

A. Bigloo et al., "A Robust Rate-Adaptive Hybrid ARQ Scheme for Frequency-Hopped Spread-Spectrum Multiple-Access Communication Systems", *IEEE Journal on Selected Areas in Communications*, No. 5, Jun. 1994, pp. 917-924.

C. Cullen et al., "The Networking of Dynamic Satellite Constellations", *European Conference on Satellite Communications*, Nov. 1993, pp. 325-329.

M.R.L. Hodges, "The GSM Radio Interface," *BR Telecom Technol J*, vol. 8, No. 1, pp. 31-43, Jan. 1990.

"Dual-Mode Cellular/Satellite Hand-Held Phone Technology," Wescon 96 Conference Record, pp. 206-222, Oct. 22-24, 1996, Anaheim Convention Center, Anaheim, California.

* cited by examiner

DUAL MODE SATELLITE/CELLULAR TERMINAL

The instant patent application is a continuation of application Ser. No. 08/996,153, U.S. Pat. No. 5,959,984 filed on Dec. 22, 1997, which is a continuation of application Ser. No. 08/899,389, U.S. Pat. No. 6,084,865 filed on Jul. 23, 1997, which is a continuation of application Ser. No. 08/501,575, U.S. Pat. No. 5,663,957 filed on Jul. 12, 1995, and is related to issued patents: U.S. Pat. No. 5,812,539, U.S. Pat. No. 5,729,538, U.S. Pat. No. 8,757,789, U.S. Pat. No. 5,757,787.

FIELD OF THE INVENTION

The present invention pertains to mobile or portable wireless telephones that can operate either through land-based cellular systems or through orbiting satellites, if no land-cellular base station is within range, and in particular to means for choosing satellite signal formats to facilitate re-use of components in wireless telephones when switching between modes so as to reduce cost.

BACKGROUND OF THE DISCLOSURE

The signal bandwidth and channel spacing used for satellite communication is generally different from the signal bandwidth used in cellular systems. One reason for this difference is that satellite communication is limited by thermal noise. As a result, satellite communications uses lower bandwidth and coding rates. On the other hand, cellular communications is interference limited, favoring higher bandwidth and coding rates.

For example, the GSM cellular system's channel spacing is 200 KHz, while the INMARSAT-M satellite system uses 5 KHz or 10 KHz channel spacing. In the latter narrowband mode, frequency and phase noise is considerably more troublesome for moving terminals or mobile stations than in the former, wideband mode. There can thus arise difficulties in attempting for economy in the terminal to re-use circuitry for both modes.

U.S. patent application Ser. No. 0.08/305,780, which is incorporated herein by reference, describes a dual-mode terminal equipped with a novel frequency synthesizer circuit that economically provides both narrowband satellite channel spacings as well a GSM spacings while meeting the stringent noise requirements in a narrowband satellite mode and the fast switching requirements for the GSM frequency-hopping mode.

Other prior descriptions of dual mode terminals that economically re-use the same components between two modes may be found, for example, U.S. patent application Ser. No. 07/585,910, entitled "Multi-mode signal processing", which is incorporated herein by reference, describes re-using the same components to process alternatively an analog FM signal according to the AMPS cellular standard or a digital cellular signal according to TIA standard IS54.

The GSM standard discloses the possibility to transmit lower bitrates by transmitting TDMA bursts at the same bitrate only less often. The GSM standard describes a so-called "half-rate" mode in which a burst is transmitted only every 16 timeslots instead of every eight. However, the same format is used in the uplink direction (mobile to base) as in the downlink direction (base to mobile), which leads to problems of high peak power requirements from the mobile phone in a satellite system.

U.S. patent application Ser. No. 08/179,954, which is incorporated herein by reference, discloses asymmetrical TDMA formats in which uplink TDMA formats can have a smaller number of timeslots combined with a greater availability of narrower bandwidth frequency channels than the corresponding downlink TDMA formats, thus reducing the peak-to-mean power ratio needed in the mobile terminal. When practicing the invention disclosed in the above incorporated application however, a terminal is not capable of being compatible with the GSM cellular standard's uplink waveform.

SUMMARY OF THE DISCLOSURE

A portable wireless terminal is now disclosed having means to operate according to a known digital cellular standard such as GSM, such means comprising receiver radio frequency components for receiving a TDMA burst and digitizing the burst and signal processing components for decoding the burst and reconstituting a voice or data signal. The inventive terminal uses the same receiver components to receive a satellite TDMA burst that preferably employs the same bitrate and format but occurs less frequently due to the digital voice signal from the satellite being encoded at a lower bitrate. The terminal transmits a TDMA burst at a submultiple of the receive bitrate for a proportionally longer time using a transmit frequency channel that is proportionally narrower in bandwidth. The transmit timeslot and transmit frequency channel allocation are linked to the receive frequency and timeslot allocation in such a way that transmission and reception at the terminal do not overlap and have an almost constant relative timing relationship as determined by a timing controller that compensates for loop propagation delay.

According to one embodiment of the present invention, a method of communicating information using Time Division Multiple Access and adaptive transmission and reception is disclosed. First, signal bursts from TDMA transmission means are transmitted to a TDMA receiving means wherein said transmission means codes said information and transmits coded information to said receiving means using at least one of two timeslots of a plurality of timeslots in a repetitive TDMA frame period. Both of said two timeslots are received whether or not said transmitting means has transmitted using said one or said two timeslots and received signals are classified as intended or non-intended. Then, successively received signals classified as intended are assembled into a block for decoding and the block is decoded to reproduce said information.

According to another embodiment of the present invention, a TDMA communication apparatus with improved transmitter power level control is disclosed. Burst receiving means receive TDMA signal bursts in an allocated receive timeslot of a repetitive TDMA frame period and measure the received signal strength. Burst transmission means transmit TDMA signal bursts in an allocated transmit timeslot of a repetitive TDMA frame period under control of a power control means. Finally, transmit power control means compute a desired effective burst transmission power level to compensate for propagation path changes based on said measured received signal strength and controlling said burst transmission means to transmit a signal burst at a controlled power level in said allocated transmit timeslot in each of said TDMA frame periods.

BRIEF DESCRIPTION OF THE DRAWINGS

These and other features and advantages of the present invention will be readily apparent to one of ordinary skill in the art from the following written description, used in conjunction with the drawings, in which.

DETAILED DESCRIPTION OF THE DISCLOSURE

Figure 1:
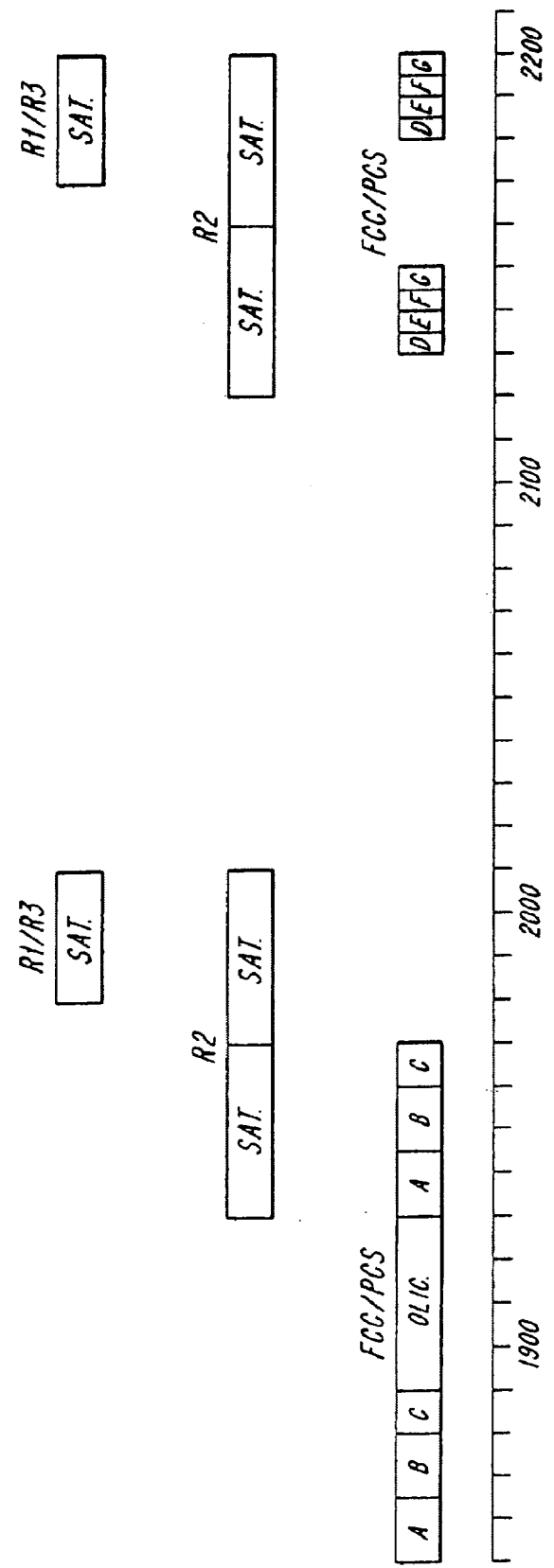
FIG. 1 illustrates the allocation of frequencies for Personal Satellite Communication services in world regions.

FIG. 1 illustrates the allocations of frequencies for Personal Satellite Communications services in world regions R1, R2 and R3 compared to FCC proposals for new frequencies to be offered by auction for new landbased Personal Communications Services. It can be seen that the PCS bands marked DEFG conflict with the satellite PSC bands. However, the FCC has at the present time abandoned plans to allocate frequency bands DEFG to PCS, and the planned frequency auction is restricted to bands marked A, B and C. The separate A, B and C groups represent up- and downlink bands for directions from mobile to base and from base to mobile, respectively, and the 80 MHz separation is known as the duplex spacing.

In between the up- and downlink bands, the frequencies will be offered on an unlicensed and largely unregulated basis. The unregulated band has no envisaged frequency duplex spacing and is only suitable for simplex, half-duplex or press-to-talk systems, or systems which use same-frequency time-duplex operation such as the Digital European Cordless Telephone Standard (DECT).

The duplex spacing between satellite uplink and downlink bands is seen to be somewhat larger. While this facilitates the construction of small, low-loss duplexers that would permit transmission and reception through the same antennas simultaneously, duplexers are still components that are preferably avoided by using the time-duplex method at least in the portable telephone terminal. Avoiding such highly frequency-selective components also facilitates the construction of a receiver that would embrace both the PCS receive band 1930–1970 MHz as well as the PSC receive band.

The present invention includes, but is not restricted to, the construction of dual-mode PCS/PSC terminals in the bands illustrated in FIG. 1. The present invention can alternatively be applied to dual-mode terminals in which the cellular band is in the 900 MHz range, or indeed in which the satellite and cellular frequency bands lie in any frequency range.

A satellite system at the present state of the art cannot approach the capacity of a landbased cellular system to serve millions of subscribers. An objective of providing dual-mode cellular satellite terminals is thus to ensure that subscribers use the high capacity cellular system wherever it is available, such that only subscribers that are temporarily outside of cellular coverage have to employ the limited capacity satellite. A satellite system can provide global coverage however, and thus the principal reason for transferring a call to the satellite system occurs when the subscriber has travelled to a country which has a non-compatible cellular system.

The satellite loading may indeed be dominated by that category of subscribers dubbed "the travelling businessman" who is temporarily outside the native cellular system for which his phone is designed to operate, albeit being within the cellular coverage of a non-compatible foreign system. Such subscribers can still receive service using the satellite mode of the inventive dual-mode terminal described herein.

In Europe, the PCS frequency bands that have been allocated are slightly lower in frequency than the PCS bands in the United States, and the duplex spacing is 95 MHz as opposed to 80 MHz. The European PCS system is known as DCS1800 and uses the 900 MHz GSM standard translated to the higher frequency bands.

Avoidance of very frequency selective duplexing filters also facilitates the construction of a terminal that operates in both U.S. and European PCS bands. Thus, it is even possible to conceive of a PCS/PSC terminal that is at home in both the U.S. PCS system, and European DCS1800 systems, thus avoiding loading the limited satellite capacity still further. For administrative reasons, such as billing the subscriber for services, such a terminal may be designed to store up to three sets of subscription data, for example a subscription with an operator of the U.S. PCS system, a subscription with a European DCS1800 or GSM system operator, and a subscription in the global satellite system. The GSM standard describes the facility to store subscription information including security and authentication keys external to the phone in a plug-in "smart card". One embodiment of the present invention can comprise using a smart card that not only contains alternative subscription information that is electronically read into the phone, but also a description of the alternative mode and therefore signal waveforms which the phone's signal processing will adopt when that subscription data is in use. For subscriber and retailing convenience however, the preferred embodiment is to adopt the same set of subscription data including telephone number and to ensure that that data will be accepted as valid in all systems when the subscriber is roaming between systems.

Avoiding loading the satellite system unnecessarily can actually enhance the satellite operator's revenue, as subscriptions can be sold and fees collected from a greater number of subscribers without risking system saturation. Subscription revenue can greatly exceed call charges when the total number of subscribers is much greater than the number of subscribers instantaneously making calls through the satellite system. Thus, it is not necessary to charge a premium to subscribers that are temporarily outside cellular coverage and who must be connected via a satellite. Call charges and billing can thus remain at the same levels irrespective of how the service is delivered, i.e., via a satellite or via a land network, so that the use of the satellite or landbased network is completely transparent to the subscriber.

Figure 2:
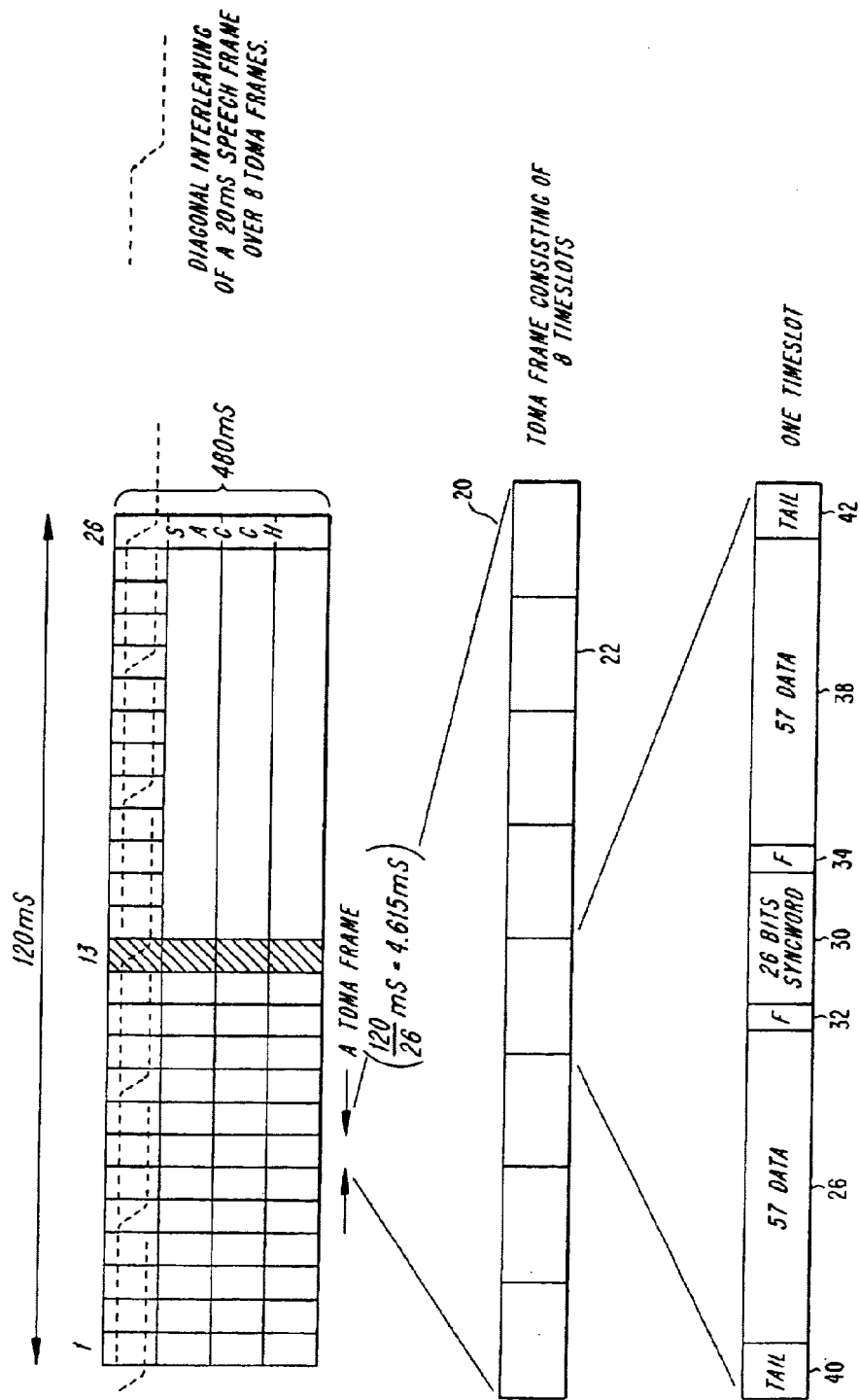
FIG. 2 illustrates a known GSM time division multiple access Format.

FIG. 2 illustrates the TDMA transmission format employed in GSM at both 900 MHz and 1800 MHz bands. A superframe comprises 4×26 TDMA frames. In every 26 successive TDMA frames, the first 12 carry traffic information. Frame 13 is idle and can be used by a mobile terminal to read identification data from nearby base stations. Frames 14–25 carry traffic information, and frame 26 carries one fourth of a Slow Associated Control Channel message (SACCH). Four such blocks of 26 frames are required to complete delivery of one SACCH message, while each group of 26 frames delivers traffic data representing six, 20 mS speech vocoder data blocks. Each 20 mS block of coded data representing a segment of the speech waveform is spread over eight consecutive TDMA frames in a process known as block-diagonal interleaving. Each 8-frame interleaved block is half-overlapped and merged with 4 frames of each of the adjacent speech blocks in order to fill each timeslot with bits that have come half from one speech frame and half from another. Each TDMA frame is then transmitted on a different frequency using frequency hopping to obtain the benefit known as interference averaging or interferer diversity.

Each TDMA frame 20 which lasts approximately 4.615 mS is divided into 8 timeslots 22. One mobile signal utilizes only one of the eight timeslots in each frame, and other mobiles use the other timeslots. FIG. 1 also shows the internal structure of data symbols within each slot. A 26-bit syncword 30 of known symbols lies in the center of the slot and is used to determine the characteristics of the transmission channel and to train an equalizer to perform optimum demodulation. On either side of the syncword, two flag bits 32 and 34, respectively, are placed. The flag bits from eight consecutive frames over which a speech block is interleaved are majority combined to form an indication of whether the interleaved block is speech, or a Fast Associated Control Channel (FACCH) message. A speech block may be stolen to send an urgent FACCH message, indicating, for example, that the mobile has reached edge of cell and is to be handed off to an adjacent cell, and the flag bits indicate to the phone when a block has been stolen for FACCH.

On either side of the Flag bits lie 57-bits of data 36 and 38, respectively, that may form part of a speech block or FACCH message as described above. Half of the 114 bits belong to one speech or FACCH block and the other half to an adjacent interleaved block. At each end of the slot, tail bits 40 and 42, respectively, are added. The tail bit periods are used partly to terminate the equalizing demodulator operation cleanly when equalizing for delayed echoes, and partly to permit the transmitter power to be smoothly ramped up and down to avoid spectral spreading into adjacent frequency channels.

One coded speech frame thus consists of half of the 114 bits from 8 consecutive slots, that is 456 bits per 20 mS or 22.8 kilobits per second on average. A portion of the 456 bits represents perceptually important speech bits transmitted with a 2:1 redundancy for error protection. A rate ½ convolutional code is used for this purpose. After decoding, the 2:1 redundancy is removed for this portion of the bits and the decoded bitrate is then an average of 13 kilobits/second. The speech vocoder operates at the 13 KB/s rate, which provides good sound quality, even with non-speech input sounds such a background noise.

A satellite system normally sacrifices some of the advantages of high quality vocoders, namely the just-mentioned robustness against non-speech background noise, in order to reduce the information rate transmitted and thus conserve satellite and mobile battery power. Power is more critical for communicating with a satellite because of the great distances involved. Typically, a satellite communications system may employ a speech vocoder operating at 4 kilobits per second. When noise limited rather than interference limited, it is not advantageous to apply error correction coding only to a portion of the speech bits, so a rate ½ code may be applied to the whole of the 4 kilobits per second, raising it to a coded bitrate of 8 kB/S. This is around ⅓rd of the GSM coded information rate. The lower bitrate could be transmitted from the satellite to the mobile using a proportionally lower bandwidth. This is undesirable however as the filter components used to establish receiver bandwidths are large and costly, and it is one objective of the present invention to avoid duplication of receiver filters for a cellular bandwidth and a different satellite bandwidth.

Alternatively, the reduced satellite bitrate could be transmitted using the same bandwidth but in a shorter timeslot containing fewer bits. The number of timeslots in the TDMA frame could then be increased to serve other mobile conversations. The energy used per conversation thus reduces, which is the objective of using the lower rate vocoder. A shorter timeslot containing fewer information bits is however not desirable, as the overhead of the sync word, flag bits and tail bits would be a higher proportion of the total throughput, leading to inefficiency and loss of capacity. Therefore, the invention comprises instead transmitting the same number of bits per slot but increasing the time between slots to reduce the average bitrate, i.e., to increase the TDMA frame period by increasing the number of slots.

The factor by which the number of slots in the frame period is increased must clearly be a small integer. The effect of this factor on raw bitrate and the number of signals accommodated per 200 KHz carrier is shown in the table below:

| FACTOR | FRAME LENGTH (SLOTS) | RAW BITRATE (KB/S) | |
|---|---|---|---|
| 1 | 8 | 22.8 | (GSM) |
| 2 | 16 | 11.4 | (GSM "HALFRATE") |
| 3 | 24 | 7.6 | |
| 4 | 32 | 5.7 | |

As the number of slots in the frame increases, it may appear that the capacity of the system is increased. However, this ignores the effect of cochannel interference. When less coding is provided, the tolerance to interference is lower and it is necessary to increase the distance between mobiles using the same channel, thus allowing frequency re-use only on a sparser grid. This trade-off is more specifically addressed in U.S. patent application Ser. No. 08/179,958 entitled "A Cellular/Satellite Communication System with Improved Frequency Reuse", which is hereby incorporated by reference in its entirety. The trade-off is repeated here in order to illustrate how the frame length (in slots) is chosen.

Clark and Cain "Error Correction coding for Digital Communications" gives the required Eb/Nos for 0.1% BER for constraint length 6 convolutional code rates of 1, ¾, ⅔, ½ and ⅓ as follows:

| r | Eb/No for BER = 0.1% |
|---|---|
| 1 | 6.7 dB |
| ¾ | 3.9 dB |
| ⅔ | 3.5 dB |
| ½ | 3.0 dB |
| ⅓ | 2.6 dB |

Values for lower rates of ¼ and ⅕th are estimated by extrapolation. These figures are without interference, and must be increased if cochannel interference is present at levels described by the Carrier to Interference ratio (C/I). The C/I that requires an increase of Eb/No of respectively 0.5, 1 and 3 dB to compensate for the interference is given in the table below:

| | REQUIRED C/I for | | | | | |
|---|---|---|---|---|---|---|
| | 0.5 dB loss | | 1.0 dB loss | | 3.0 dB loss | |
| Coding rate | BPSK | QPSK | BPSK | QPSK | BPSK | QPSK |
| 1 (none) | 17.2 dB | 20.2 dB | 13.7 | 16.7 | 9.7 | 12.7 |
| ¾ | 13.2 | 16.2 | 10.9 | 13.9 | 6.9 | 9.9 |
| ⅔ | 12.2 | 15.2 | 8.7 | 11.7 | 4.7 | 7.7 |
| ½ | 10.5 | 13.5 | 7.0 | 10.0 | 3.0 | 6.0 |
| ⅓ | 8.3 | 11.3 | 4.8 | 7.8 | 0.8 | 3.8 |
| ¼ | 6.8 | 9.8 | 3.3 | 6.3 | −0.7 | 2.3 |
| ⅕ | 5.7 | 8.7 | 2.2 | 5.2 | −1.8 | 1.2 dB |

It may be seen that while the Eb/No needed for a given error rate planes out with increasing coding, the C/I requirement becomes continuously more relaxed as the coding is increased due to the steadily increasing bandwidth, which provides an increasing spread-spectrum processing gain upon decoding.

The above results for the static channel are pessimistic for fading channels. When Rician or Rayleigh fading is present, the mean Eb/No must be increased above the static Eb/No requirement to maintain the same error rate. However, on the satellite downlink, the C/I ratio does not exhibit fading, because both the I and C components reach a given mobile over exactly the same channel and fade by exactly equal amounts. Thus the C/I does not reduce 10 dB when the Eb/No fades 10 dB, but stays at the original value. Since most of the errors occur when the Eb/No fades much below its mean value, the effect of additive C/I of 10 dB at that point is not so important.

Returning to the choice of frame length factor equal to 1, 2, 3 or 4, these numbers equate to coding rates of approximately 4/22.8=⅕ approx; 4/11.4=⅓ approx; 4/7.6=½ approx, and 4/5.7=rate ⅔ approx, given a 4 kilobit uncoded voice bitrate to be transmitted.

From the above table therefore, it can be seen that the C/I needed for less than 0.5 dB degradation of the Eb/No power budget, using QPSK modulation in a static Gaussian noise channel would be approximately as shown in the table below:

| Frame length in slots | C/I for QPSK and <0.5 dB Eb/No loss | C/I for IM = −20 dB | C/I for −20 dB IM and −16 dB adj. ch. |
|---|---|---|---|
| 8 | 8.7 | 9.1 | 10.01 |
| 16 | 11.3 | 12.0 | 14.09 |
| 24 | 13.5 | 14.6 | 20.2 |
| 32 | 15.2 | 16.6 | not satisfied |
| 8 | 5.2 | 5.35 | 5.7 |
| 16 | 7.8 | 8.07 | 8.8 |
| 24 | 10.0 | 10.46 | 11.9 |
| 32 | 11.7 | 12.4 | 14.9 |

It is thus seen that increasing the number of slots, while appearing to increase the capacity, also increases the C/I requirement, which means that a greater distance must be maintained between co-channel users, thus decreasing the area density of conversations per Megahertz.

Another source of co-channel interference is intermodulation (IM) in the satellite transmitter power amplifiers. Intermodulation may be reduced, but only at the expense of power conversion efficiency from expensive solar-cell generated DC power to radio frequency communications power. Using IM reduction techniques disclosed in U.S. patent application Ser. No. 08/179,947 entitled "Waste Energy Control And Management in Power Amplifiers", which is hereby incorporated by reference, it is possible to obtain −20 dB intermodulation at zero dB of input backoff, by which is meant that the transmitter power amplifiers saturate already at an instantaneous signal level equal to the ms value. The C/I needed when intermodulation of −20 dB is present is indicated in the second last column of the above table.

Another source of interference is adjacent channel interference. The GSM modulation is Gaussian Minimum Shift Keying (GMSK) with a Gaussian filter having a BT product of 0.3, where BT is the product of the −3 dB bandwidth B with the bit period T. This is described more fully in the GSM specifications. GMSK(BT=0.3) modulation leads to energy in the adjacent channels +/−200 KHz away that is around 18–20 dB down on the main lobe energy. As long as the satellite radiates adjacent channel signals at the same power level as a wanted signal in between, the sum of the interference from both adjacent channels would be between −15 and −17 dB relative to the wanted signal. Using a median value of −16 dB, the last column in the above table gives the co-channel C/I needed with both PA intermodulation of −20 dB and adjacent channel interference totally −16 dB. This indicates that the 32-timeslot option no longer meets the required signal quality with only an 0.5 dB loss of Eb/No performance, due to insufficient coding. The second table shows the C/I needed for a 1 dB loss of Eb/No performance, showing that 32 slots can still in principle be accommodated.

In practice, there are two factors mitigating the effect of interference:
  (1) The already mentioned fact that co-channel C/I does not vary with fading, and
  (2) The use of Discontinuous transmission, which means that half of the co-channel and adjacent channel interferers are momentarily silent.

Against the above mitigating factors however, the assumption that adjacent channel interferers are at the same level as the wanted signal may not be true. It is desirable in a satellite or cellular system to employ automatic power control to direct extra power only to those mobiles that are temporarily disadvantaged and to reduce power to those in a favorable situation. In this way, the total downlink power divided by the number of links supported is determined by the mean propagation plus fading loss and not the worst case. The power control algorithm can operate independently on the adjacent channel signals such that they are increasing while the wanted signal power is being decreased. To allow adjacent channel signals to have a 10 dB higher power than the wanted signal, it is desirable that the spectral spreading of the modulation be reduced and that adjacent channel energy be reduced from the −18 dB to −20 dB range to the −28 to −30 dB range.

The adjacent channel energy using GMSK results from it being a constant amplitude modulation. Constant amplitude modulation is preferred for transmission from mobile phones as constant-envelope transmitters are simpler and more efficient than non-constant envelope or linear transmitters. There is however no disadvantage in using linear modulation on the satellite downlink, as the active phased-array satellite transponder is in any case adapted to deal with multiple signals, whose composite sum has a varying amplitude. The receivers in GSM mobile phones are furthermore normally adapted to treat the received signal as if it were a linearly modulated signal. This approximation of GMSK to a linearly modulated signal simplifies the receiver design while causing only a small loss of Eb/No performance that is of no consequence in cellular systems. The use of linear modulation for the satellite downlink, for which GSM mobile phone receivers are perfectly adapted, will thus improve the receiver performance compared to transmitting GMSK, as well as reducing the adjacent channel energy. The linear modulation that is compatible with GSM receivers is a form of Offset Quadrature Phase Shift Keying (OQPSK). This modulation is generated by applying positive or negative-going signal impulses representing even-numbered data bits to one filter channel (the I-channel) alternately with applying signal impulses representing the odd-numbered data bits to a second filter channel (the Q-channel). The filtered outputs of the I and Q channels then multiplicatively modulate a Cosine and a Sine carrier wave respectively which are then added to form the OQPSK signal. The filter characteristics thus define the transmitted spectrum. GSM uses Gaussian filter shapes defined by a BT product of 0.3. This restricts the bandwidth and causes some intersymbol interference, which nevertheless is compensated by the equalizing receiver. Reducing the BT product to 0.25, for example, improves the suppression of adjacent channel energy at the expense of introducing more ISI. This would not be desirable in the GSM system where the equalizer needs to reserve is capability to deal with ISI arising from delayed echoes in the land-mobile radio propagation environment caused by reflections from mountains, tall buildings and so-on. The satellite-mobile propagation path suffers less from such delayed echoes however, as the path is more nearly line-of-sight. Therefore the adjacent channel suppression of the satellite transmissions may also be improved by more filtering such as by reducing the BT product of the Gaussian premodulation filters, as well as by using GMSK-compatible linear modulation, both techniques being completely compatible with existing GSM mobile phone reception techniques.

Nevertheless, this only mitigates the effect of adjacent channel powers potentially being higher than the wanted signal due to the operation of dynamic power control, so that the assumptions in the above tables are valid. The result illustrates that the amount of room for coding in the 32-slot case is marginally insufficient is a potential problem for adopting the 32-slot format as the one and only waveform available.

To achieve the co-channel C/I values required for different amounts of coding, mobile stations re-using the same channel must be separated sufficiently on the ground. The aforementioned application which has been incorporated herein by reference discloses how mobiles may be sorted into groups that satisfy the separation requirement for co-channel operation. Greater C/I values require greater separations, which leads to a reduced capacity per unit area for the use of that frequency. Since in the future substantial sums may be paid at auction for the right to use a given amount of frequency spectrum, reducing the capacity served for each frequency bought is not economically desirable. The capacity provided in a given amount of frequency spectrum is however dependent on a combination of the re-use distance needed to achieve the required C/I, and the bandwidth occupied by each signal, and both the C/I requirement and the bandwidth vary contrarily with the amount of coding. The re-use distance for achieving a given C/I may be shrunk through the use of larger antenna arrays with fine angular resolution, but this increases the cost of the satellite and therefore comparison of different choices needs to be made on the basis of a constant antenna aperture.

Figure 3:
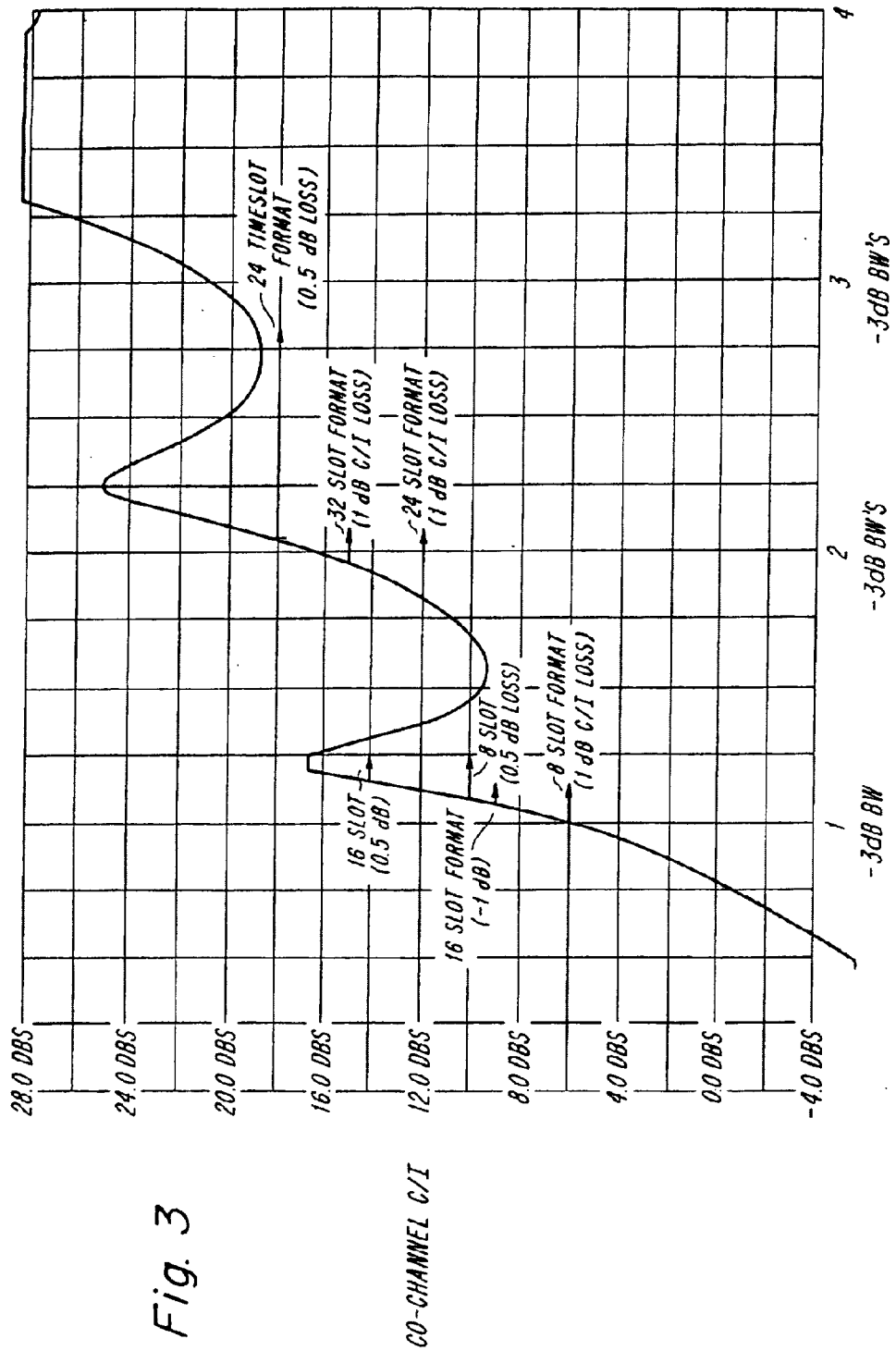
FIG. 3 illustrates co-channel carrier/interference as a function of the re-use distance.

The C/I caused by co-channel interference from other antenna beams or directions is a function of the antenna pattern sidelobe characteristics. The sidelobes and thus the interference from adjacent beams may be reduced by tapering the power profile across the array. However, tapered illumination reduces the aperture efficiency and thus the gain compared to uniform illumination. Moreover, the sidelobe level of large phased arrays can be very dependent on phase and amplitude tolerances, which are therefore preferably controlled adaptively as described in the aforementioned patent application. With non-adaptive control, perfect phase and amplitude matching and uniform aperture illumination, the co-channel C/I is shown in FIG. 3 as a function of the re-use distance. The distance is given in terms of the −3 dB diameter of the main radiation lobe.

The grid spacing for 0.5 and 1 dB C/I loss respectively as a function of the number of timeslots (amount of coding) from FIG. 3 must be greater than the following:

|  | 8-slot | 16-slot | 24-slot | 32-slot |
|---|---|---|---|---|
| 0.5 dB loss | 1.09 D | 1.2–1.9 D | 2.05 D | 3.3 D |
| 1.0 dB loss | D | 1.07 D | 1.13–1.8 D | 1.95 D |
| CAPACITY (CHANNELS PER 200 KHz PER D²) | | | | |
| 0.5 dB C/I loss | 6.7 | 4.4–11 | 5.7 | 2.9 |
| 1.0 dB C/I loss | 8 | 14 | 7.4–18.8 | 8.4 |

The uncertainty for the 16-slot (0.5 dB C/I loss) and 24-slot (1 dB C/I loss) cases is due to optimistically counting on a 3 dB C/I increase due to DTX and the pessimistic assumption that the peaks in the C/I versus distance separation curves will be eroded due to irregularities in the frequency re-use grid, or by the array radiation diagrams not showing clean nulls in their sidelobe patterns. The use of adaptive array signal processing tends to produce the higher figure while non-adaptive array processing tends to produce the lower figure.

Figure 4:
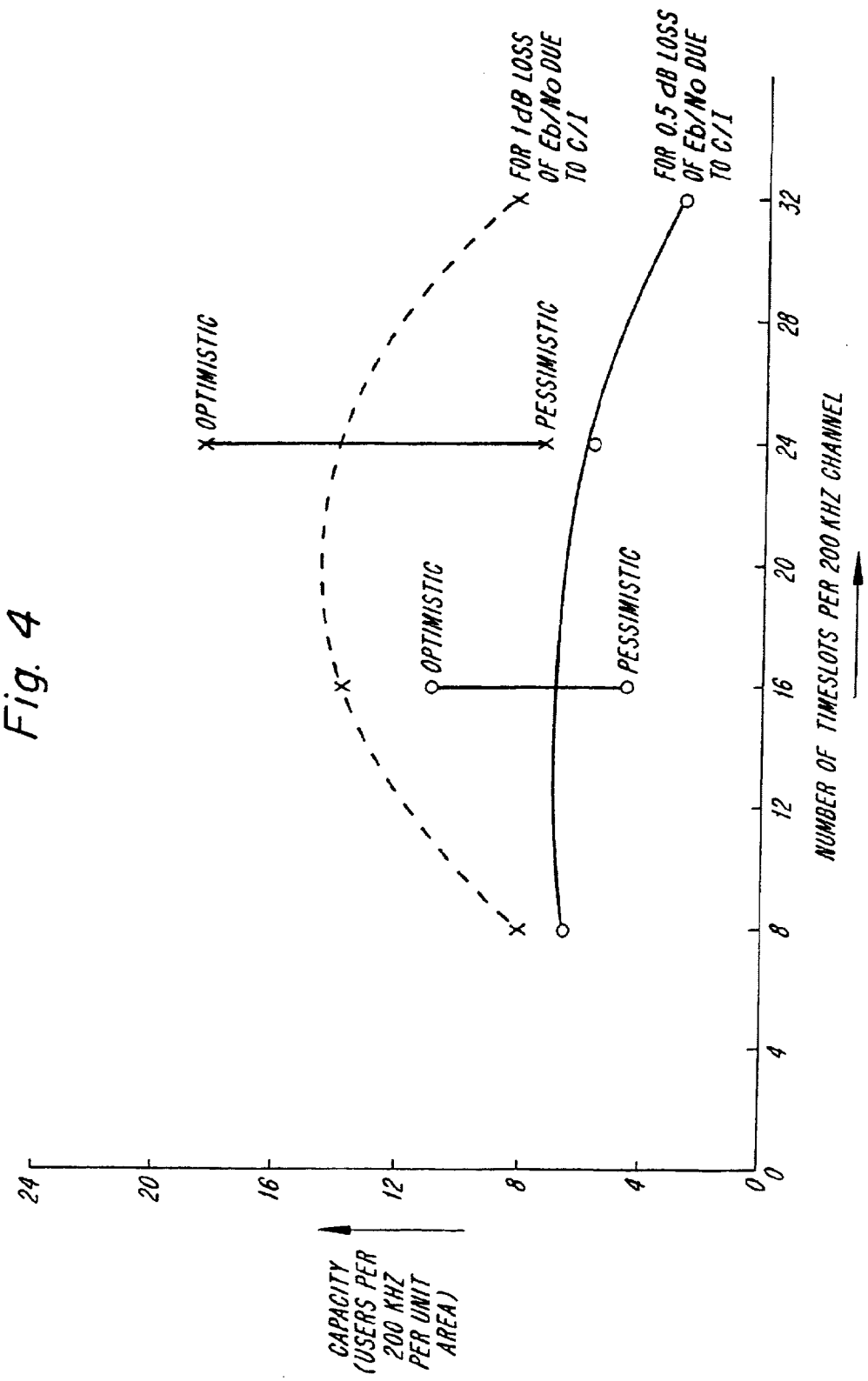
FIG. 4 illustrates the number of timeslots per 200 $KH_z$ channel.

A summary of these capacity estimates is plotted in FIG. 4. It is clear that a choice of 16 or 24 with a leaning towards the smaller number results in the greatest spectral efficiency for a given impact on power efficiency. When account is taken of the extra 0.4 dB of coding gain in the use of rate $\frac{1}{3}$rd coding (16 timeslot case) as opposed to rate $\frac{1}{2}$ coding (24 timeslot case), the power efficiency of the 16-slot case with 1 dB degradation due to C/I is equivalent to that of the 24-slot case with 0.5 dB degradation. However, the capacity estimates for these two cases are 14 and 6 for 16 and 24 timeslots, respectively, which reinforces the argument for fewer timeslots and more coding, i.e. the 16-timeslot choice. Thus, the so-called GSM half-rate TDMA format has been demonstrated to be close to an optimum choice for a satellite communications waveform from both power and bandwidth efficiency viewpoints, although it is used in this invention in a different way from that envisaged in the GSM standards. The half-rate TDMA format is used in GSM to transmit half the information rate while the format is used in this invention to transmit $\frac{1}{4}$ the information rate with twice as much coding. This facilitates the construction of a dual-mode satellite/cellular terminal and opens the possibility to also revert to the GSM half-information-rate speech vocoder in the satellite mode in order to obtain higher quality satellite communications when link margin allows, dropping back to a 4 Kilobit vocoder when needed to maintain the link as signal levels become marginal.

The option is also open to occasionally transmit only every alternate one of the allocated slots in a nominally 16-slot frame using a coding rate of $\frac{2}{3}$rds approximately instead of $\frac{1}{3}$rd, that is to adopt a 32-slot frame, when conditions allow. A further option is to transmit the allocated slot in a 16-slot frame alternately from a first and a second satellite to obtain path diversity, as described in U.S. patent application Ser. No. 08/354,904 entitled "Satellite Diversity", which is also incorporated by reference herein. The bits transmitted by each satellite should preferably be chosen each to constitute rate $\frac{2}{3}$rds codes such that either alone could be efficiently decoded, signal quality permitting, while both can be jointly decoded as a rate $\frac{1}{3}$rd code when the signal quality of neither alone is adequate. Satellite diversity according to this technique provides improved performance when the signal from each satellite fades independently, as can happen due to the user turning his head and shadowing the signal from one satellite but not the other. As a final option, noting the ability to receive information with a rate $\frac{2}{3}$ rds code and only using every 32nd slot when signal quality allows, this mode can be useful in certain non-uniform traffic distributions in order to increase the peak capacity in certain cells when the neighboring cells are lightly loaded. When other cells do not need to use the same frequency channel due to a low traffic demand in those cells, the C/I is improved allowing rate $\frac{2}{3}$rds coding and the 32-timeslot format to suffice, thus doubling the capacity in a cell with a high traffic demand. According to one aspect of the invention, the transmission of information every 32th slot using rate $\frac{2}{3}$rds coding, for example, or every 16th slot using twice a much coding may be chosen by the satellite system at any time and even dynamically without forewarning the mobile phone of the change. According to the present invention, a mobile station receives every 16th slot all the time but determines when that slot contains intended information and if not labels the missing bits as erasures or zero quality values at the input of the error-correction decoder.

The system may, for example, indicate when the information transmitted in a slot is not intended for a particular phone but for another phone by using different syncword patterns embedded in the TDMA burst according to FIG. 2. The different syncwords are preferably chosen to be orthogonal patterns to facilitate discrimination. Even when two conversations to two phones are taking place using odd and even 16-slot frames, respectively, i.e., each mobile gets every 32nd slot interleaved with the other mobile, when one speaker is temporarily silent, which happens half the time (DTX), the other mobile may be sent every 16th slot thus providing doubled coding protection for at least half the time to both mobiles.

Figure 5:
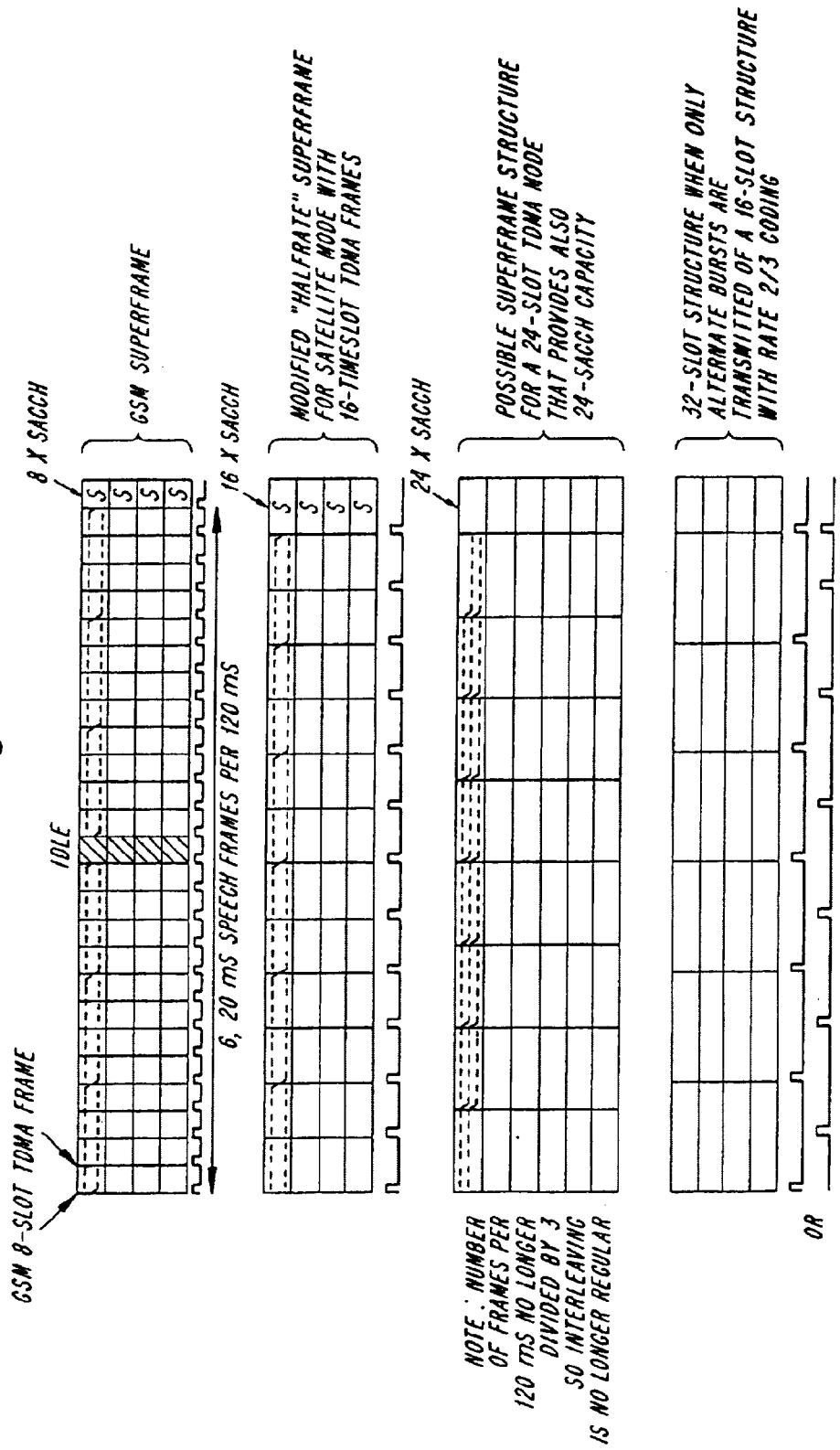
FIG. 5 illustrates 8, 16, 24, and 32-slot formats according to one embodiment of the present invention.

FIG. 5 illustrates TDMA frame structures that can be formed when using 8, 16, 24 or 32-slot frames. In the 16-slot TDMA frame case, it is also necessary to provide 16 independent SACCH message transmissions. This is done by eliminating the idle frame (13) and instead forming a double-length SACCH frame. The idle frame is no longer necessary, as even if the receiver must scan alternate channels without losing traffic data, the 16-slot format provides one of the original 8-slot frame periods of free time in every TDMA frame compared to the GSM 8-slot format; thus adequate spare time is available in the format for scanning for other signals if this is desired.

The SACCH frame is also changed to 16 slots in conformity with the speech frames, since this gives a more regular structure than transmitting the additional 8 SACCH messages in the original idle frame positions of the 8-slot structure. The 16-slot frame structure also provides 6, 20 mS voice frames or 3, 40 mS voice frames of data per 120 mS structure repetition period with the same interleaving pattern for all channels. Unfortunately this desirable feature is difficult to provide with the 24-frame format. When three 8 slot frames are grouped to form a 24-slot TDMA frame, the number of 24-slot frames per 120 mS structure period becomes 8. However, 6, 20 mS voice frames or 3, 40 mS voice frames have to be interleaved over the 8 TDMA frames. Since 8 does not divide by three, the same interleaving pattern cannot be used for all speech frames. On average, a TDMA burst in the 24-slot format must contain $\frac{3}{4}$ of a 20 mS speech frame, so 1 and $\frac{1}{3}$rd bursts are required to accommodate a whole speech frame. The interleaving pattern can be made regular, i.e., the same for all speech frames and channels, only by increasing the interleaving delay to span a multiple of three TDMA bursts, i.e. 24, which is undesirable because of the attendant increase in speech delay, or by changing the vocoder analysis frame period from 20 or 40 mS to 15 mS or 30 mS, such that a 120 mS structure period then contains 8 or 4 vocoder frames which can be distributed between the 8 TDMA frames in a regular manner. Since most available vocoders operate on 20 mS or 40 mS frames, the 15 or 30 mS vocoder frame is not a preferred option.

FIG. 5 also illustrates a 32-slot frame structure. This is not necessarily intended to support 32 independent users from a bandwidth efficiency perspective, as that would require 32 independent channels of SACCH messaging. This may in turn require an increase in the structure period to 240 mS in order to obtain a 32-slot SACCH frame once in every 52 of the original GSM frame periods. This is not a preferred approach as it introduces a 16 mS hiatus in speech transmission that has to be bridged by means of a delay buffer, thus adding extra speech delay. The 32-slot TDMA structure is primarily intended to be regarded as the transmission of a burst allocated in a 16-slot TDMA frame every second frame, when signal quality allows, in order to accommodate more users from a satellite power utilization perspective. The slots not transmitted in one beam can be chosen to coincide with slots that are transmitted in half of the surrounding beams and both adjacent channels in the same beam, thus improving C/I. In other words, alternate frequency channels in the same beam transmit in alternate ones of the 16-slot frames, while co-channels in a second beam transmit in slots corresponding to adjacent channel transmissions in the first beam. If the advantage of the 32-slot structure is to be used to improve capacity in heavily loaded cells when traffic distribution is uneven, as described above, the SACCH message can be addressed to one or another mobile sharing the same channel in alternate frames by using an odd/even indicator bit in the body of the message.

A rate ⅓rd code can be constructed as a rate ⅔ths code, which generates 6 coded bits for every two information bits that are input. Furthermore, the six coded bits can be distributed by interleaving between two successive TDMA frames such that three of each six occur in both frames and constitute a good rate ⅔rds code when only alternate frames are used, and which may be regarded as a punctured rate ⅔ths code. In a punctured rate ⅔ths code, if the 6 coded bits are labelled P1, P2 . . . P6 it need not be so that P1, P2, P3 are assigned to one burst and P4, P5, P6 to the next burst for every information bit-pair, but can for example mean that coded bits P1, P2, P3 for even data bit-pair shifts into the encoder are assigned to the same burst along with P4, P5, P6 for the odd data bit-pairs. This guarantees like performance of the rate ⅔rds code obtained by a mobile receiving either the odd or the even TDMA frames, as all six encoding polynomials are used in equal amounts in both cases. A punctured rate ⅓rd code can also be employed, with P1 being assigned to even TDMA frames for even data bits and P2, P3 being assigned to odd frames for even bits, and vice versa. This also guarantees like performance whether only odd frames or even frames are received.

When a 16-slot format is used and alternate frames are transmitted from different satellites, the frames may or may not be transmitted on the same frequency. The GSM format includes sufficient guard times to allow a frequency synthesizer to change frequency between even and odd frames in order to construct a frequency hopping system. Thus satellite diversity can be provided by transmitting the even frames from one satellite on frequencies f0, f2, f4 . . . and in between transmitting the odd frames from another satellite on frequencies f1, f3, f5 . . . .

When only one satellite is available, it may transmit only even bursts, only odd bursts, or both, according to the link margin and coding gain needed. When only even bursts are transmitted, the odd bursts may be used for another 16 mobiles and a 32-slot TDMA system is in use. In any duplex conversation, on average one party is silent for half the time, due to the other party talking. Thus even when different mobiles use an even slot and a corresponding odd slot respectively, both slots are available to transmit to each mobile for on average half the time, when the speech for one of the mobiles is temporarily silence. Moreover, with the use of independent frequency hopping for the odd and even frames it can be arranged that the odd slot corresponding to the even slot allocated to a particular mobile is not always associated with the same other mobile. Thus the probability of the corresponding slot being silent and thus available for enhancing transmission is a random 50% from frame to frame. This is an improvement on the earlier description of using DTX such that each mobile benefits from the other's silence half the time, in that the periods when both are talking and neither benefiting from receiving every frame are not prolonged periods when frequency hopping is employed in this inventive manner.

According to this aspect of the invention, one mobile is allocated a first one out of every 32 slots in a TDMA signal structure on which it will always be given priority to receive information, and a second slot on which it may also receive information if so indicated by an indication contained therein. A second mobile is given priority to receive information on the second slot while receiving information also using said first slot when the first mobile does not need priority due to that direction of conversation being temporarily silent. Furthermore, the frequency on which information is or may be transmitted to a particular mobile is varied every 16 slots by means of a frequency hopping sequence generator, so that the two mobiles paired in the above manner are not always the same two mobiles but are paired with others pseudorandomly from frame to frame.

Using the above aspect of the present invention, a mobile receiver cannot predict whether every 16th slot will contain intended information or every 32nd slot will contain intended information. Consequently, the mobile receives both odd and even slots and checks for an identifier to determine if the slot is identified as intended for it or for a different mobile. The GSM format comprises a 26-bit syncword in the middle of the slot which is always the same bit pattern for an intended mobile. The other mobiles that can transmit on that slot may be allocated different syncwords preferably orthogonal to the intended syncword so that their intended information may be easily discriminated.

The GSM standard discloses interleaving blocks of speech data representing 20 mS speech segments over eight full-rate frames, using every 8th slot over an 8-frame, 64-slot interval. The speech blocks are diagonally interleaved over this interval with half of a previous block in the first four frames and half of a subsequent block in the second four frames.

In the 16-slot frame format, the same interleaving period comprises only four of the longer frames, wherein two of these frames are the even frames discussed above and two are odd frames. Each frame may or may not contain data for the same mobile depending on whether the signal for another mobile is silent or not. Therefore, each mobile receives both an odd and an even frame slot and the mobile determines if the slot contains data for it. The slots deemed to contain intended data are demodulated to obtain coded bits. The coded bits are in the form of "soft decisions" that comprise quality information related to signal to noise ratio of the bit. Bits not received corresponding to a slot deemed not to contain intended information are given a quality or soft value of zero, corresponding to a symbol erasure. Bits having the erasure indication are said to have been punctured out and the subsequent error correction decoding can save resources by not including punctured or deleted code bits in its decoding process. After deinterleaving, bits originally punctured out in a contiguous block due to the whole slot being non-intended are dispersed between bits of non-zero quality and so the error correction decoder receives many good bits in any section of coded data, thus enabling it to decode the information. In any speech block, two slots will definitely have contained valid data giving three coded bits per two information bits, that is 6 coded bits for four information bits, while half of the other two slots will also contain intended data, giving a further 3 bits on average representing the same four data bits. Thus, the average coding rate obtained is 9 coded bits per four data bits, or better than rate ½ coding. The least coding obtained is rate ⅔rds, while the most coding obtained is rate ⅓rd when all four successive slots are directed to the same mobile. The random variation of coding rate between rate ⅔rds, rate ½ and rate ⅓rd from one speech frame to another is not of particular significance, as the perceived speech quality is related to the mean speech block error rate, usually called a frame erasure rate (FER). Correct decoding of a speech block may be checked by including a Cyclic Redundancy Check code in the block. Blocks detected with the help of the CRC code to have been decoded in error are termed Erased. An erased block, representing a 20 mS segment of the speech waveform, is prevented from causing an annoying click or noise burst in the earphone by replacing it with a sound segment previously received correctly. This technique of "bad frame replacement" is disclosed in British Patent No. 2 103 052 and U.S. Pat. No. 4,532,636, which is incorporated herein by reference. Variations adapted to voice coders that represent speech segments by sets of numerical parameters are also known by the general term "parameter interpolation". Parameter interpolation may be used to bridge over speech frames lost due to errors, and acceptable speech quality for telephone calls is deemed to be obtained when the FER is 5% or less. Thus, providing some frames with more coding and energy than others reduces the FER compared to transmitting only the 32-slot format, and thus allows the quality criterion to be met even though the same number of mobiles has been accommodated in the spectrum as if the 32-format had been used permanently.

The above technique improves spectral utilization efficiency by accommodating twice as many users in the same bandwidth while using an increased amount of coding on average per signal, through exploiting discontinuous transmission (DTX). DTX may always be exploited to provide 3 dB in power efficiency by simply driving the satellite transponder 3 dB harder towards saturation to compensate for half the signals being silent. The active signals get roughly double the power on average by this means.

Attention is now turned to the corresponding uplink format. It is not desirable to increase the number of slots in the uplink TDMA frame when the vocoder bitrate is reduced, since this increases the peak-to-mean ratio of the mobile phone transmitter. Portable battery operated phones are limited in the peak current as well as the mean current that can efficiently be drawn from the battery, owing to the battery's internal resistance, which increases at end-of-life. Therefore the preferred solution for the uplink is to reduce the bandwidth of the transmission or to use more coding, in both cases with the aim of avoiding an increase in peak-to-mean power ratio. As has been seen in the case of the downlink, increasing the bandwidth by use of redundant coding does not necessarily cause a loss in spectral efficiency and capacity, but the reverse, due to a reduction in the frequency re-use distance.

Figure 6:
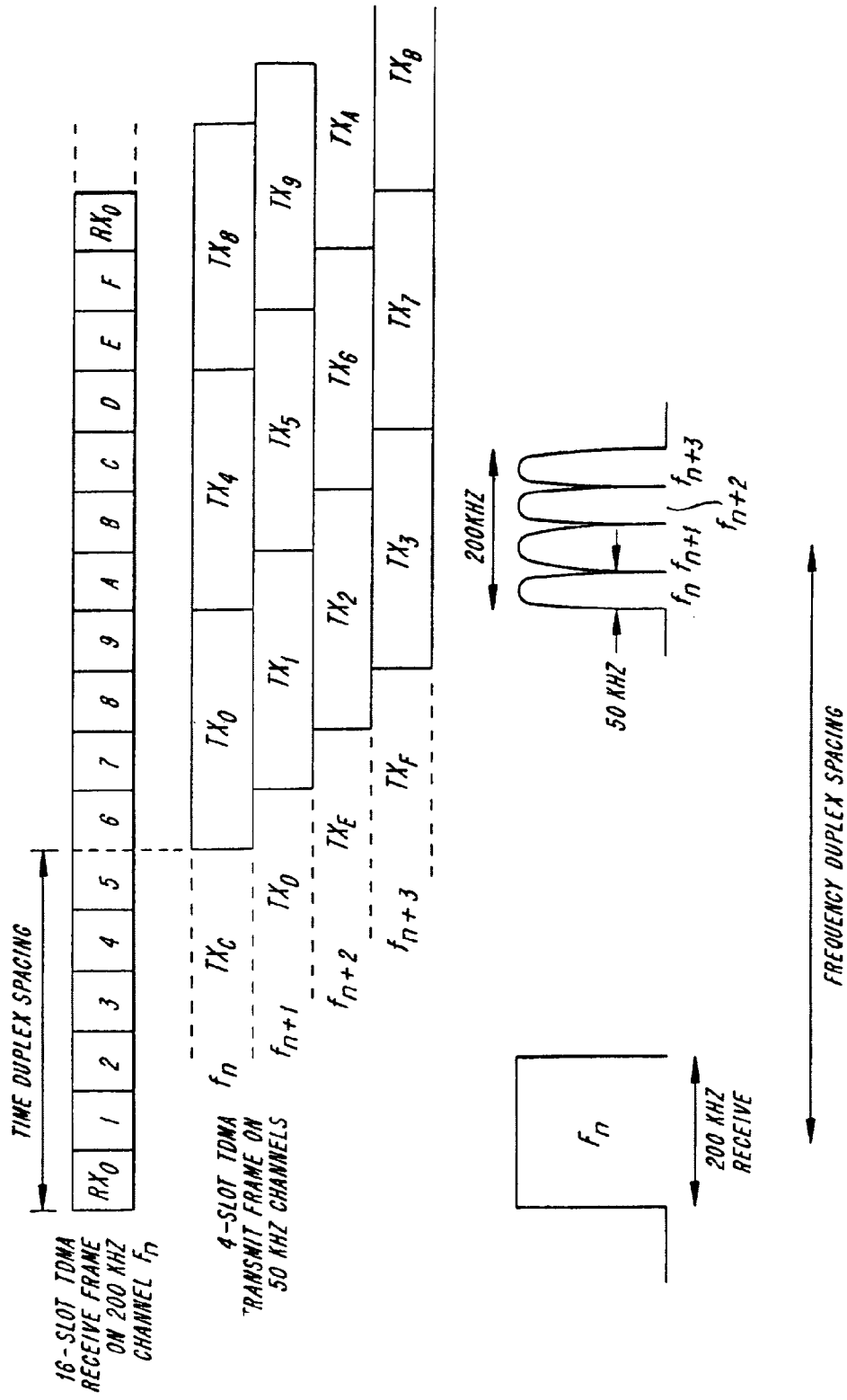
FIG. 6 illustrates the correspondence between uplinks and downlink according to one embodiment of the present invention.

FIG. 6 shows the correspondence between up and downlink frequencies and timeslots when using the invention disclosed in U.S. patent application Ser. No. 08/179,954, and the uplink comprises 4 timeslots on each of four 50 KHz channels in 1:1 association with 16 timeslots on one 200 KHz downlink channel. The incorporated invention provides a nominally constant time-duplex spacing between transmit and receive for all channels, which is useful in simplifying the design and operation of the mobile phone.

Just as alternative 32-slot and 16-slot operation modes may be dynamically mixed on the downlink, the present invention comprises corresponding alternative 8 and 4-slot modes on the uplink. The motivation and dynamic selection by the mobile to transmit on every 4th uplink slot or every 8th uplink slot is different from the motivation of the system to use 32 or 16 slot formats on the downlink. The system chooses to transmit in the 16-slot format when it is power limited and not bandwidth limited, as the 16-slot format contains more coding and is thus more power efficient. The satellite's multi-carrier power amplifiers thus need to allocate a smaller proportion of their total power to a particular mobile if the 16-slot mode is used.

By contrast, the mobile unit conserves power when transmitting in the 8-slot format rather than the 4-slot format, as it transmits more efficiently using a higher power for half the time than a lower power for twice the time. Since the mobile does not have a multi-carrier power amplifier, its transmitter achieves maximum efficiency at full power. In this mode of operation, the mobile unit is allocated every 4th uplink slot but it may choose sometimes to omit transmission of alternate slots and thereby adopt the 8-slot format, or indeed not to transmit at all if the speaker is temporarily silent (DTX) thus conserving the most power. The SACCH frame is however always transmitted on both up and down links irrespective of the voice activity, so as to maintain link synchronization. The mobile also is able to transmit at either full power or any one of a number of progressively lower power levels as further means of saving battery power, as "talk time" between battery charges is of critical interest to the user.

The choice of power level and the use of 4 or 8 slot uplink mode is made by the mobile using a power control algorithm. The preferred power control algorithm comprises both an open loop and a closed loop element, defined by the equation:

EFFECTIVE TRANSMIT POWER LEVEL=CONSTANT−RECEIVED SIGNAL STRENGTH with the understanding that all quantities are on the logarithmic decibel scale. For example, if the maximum effective transmit power level available is 0.5 watts (+27 dBm), and the minimum decodable signal strength is −112 dBm, the above equation might read:

EFFECTIVE TX POWER (dBm)=(−85)−RECEIVED SIGNAL STRENGTH (dBm)

It can be verified that the above equation sets the effective transmitter power to the maximum value of +27 dBm when the received signal strength is at the minimum useable value of −112 dBm. This is based on the reasonable assumption that the uplink path will also be marginal when the downlink path is marginal, thus requiring maximum transmitter power. The closed loop element of the above power control algorithm comprises allowing the fixed network via a land base station or satellite relay station to control the value of CONSTANT used by the mobile to be values other than the exemplary −85 used above. For example, if the network controls the power level it allocates to transmit to the mobile terminal, then the signal strength received at the mobile varies with the allocated downlink power level even if the downlink propagation path has a constant attenuation. The fixed network should therefore from time to time by means of the SACCH message facility, for example, command the mobile to use different values of CONSTANT in dependence on the mean level of downlink power transmitted for that mobile. Alternatively or additionally to the relatively slow SACCH mechanism for performing closed loop power control, a faster feedback method can be employed which allocates one bit of transmitted data to signify to the mobile that it shall step up or step down its transmitter power by a given amount, for example by incrementing or decrementing the value of CONSTANT. Considering propagation delays in a satellite system however, the speed advantage over the use of SACCH may not be great.

An alternative power control system may be used which provides the mobile unit with more control over the power used on both uplink and downlink. Usually a system operator does not wish to place control in the hands of mobile units. However, in the case of satellite communications where billing rates can be adjusted according to the satellite power consumed, the problem of potential abuse is less worrisome. It is in any case normal practice for the mobile unit to report, using the SACCH message facility, the signal quality or strength it recently received on the downlink. The network station receives the information relayed over the satellite from all active mobiles and then reallocates the downlink power to attempt to equalize their received signal qualities based on the reported signal quality.

By making the algorithm that the network uses to allocate downlink power based on reported signal quality a deterministic or predictable one, the mobile can predict ahead of time after sending a signal strength report what power the network will allocate on the downlink to that mobile in some future frame delayed by the loop propagation delay to and from the satellite and ground network. Thus, the mobile can itself adjust the value of CONSTANT to compensate for future changes in the downlink power.

Irrespective of which of the above variations of power control algorithm is used, the required transmit power is first determined as a numerical value inside the control processor of the mobile terminal. The power level computed is then used to command the duty factor (4 or 8 slot mode) and the burst power level of the mobile transmitter. If the maximum power level is demanded, the mobile uses the 4 slot mode at maximum burst power if the network has previously indicated that the mobile may transmit on every 4th slot. Otherwise, the 8-slot mode is used at maximum burst power.

For power levels between maximum and 3 dB below maximum, the 4-slot mode is also used with a power level reduced by up to 3 dB. For power levels of 3 dB or more lower than maximum, the 8-slot is used either at full burst power (corresponding to a demand for full power −3 dB) or at less than full power. As an alternative the mobile can alternate between transmitting the 4-slot and the 8-slot mode, effectively deciding on a frame by frame basis in dependence on the received downlink signal quality in the previous downlink burst whether it shall transmit also on a second slot out of every 8 or only on one of the 8.

Thus, it can be seen that the preferred power control method is to employ a duty factor variation between ¼ and ⅛ to effect the top 3 dB of power control range, as this may be accomplished while leaving the transmitter in its most efficient full-power regime during the transmitted bursts. When more than 3 dB reduction of power is called for, the preferred approach is to have the mobile transmit at the highest and most efficient burst power level but with the lower or lowest duty factor available. In a satellite or cellular system, considerable link margin must be available to cope with fading and shadowing that can occur depending on the mobile's location or movements, but maximum margin is not required all the time. Dynamic power control as disclosed above allows the mobile unit to achieve considerable battery power savings on average by only using high power or a duty factor when needed.

The use of an ⅛ alternative ¼ duty factor as an uplink power control means is different from its use to double capacity in bandwidth-limited cells. Both modes may however be used in the same system as long as the system indicates to a mobile which mode it shall assume from time to time, such as at call set up or later during a call by using SACCH or FACCH messages or other mechanism. For example, the mobiles in a heavily loaded cell can be divided by the network into a group that is signal-strength-disadvantaged, for whatever reason, that shall be allowed to use 4 or 8-slot mode dynamically, and a group that is more favorably disposed that can get by with 8-slot operation, thus doubling the capacity for that group. Regrouping can take place dynamically should a mobile unit change from being favorably located to being unfavorably located. When two satellites illuminate the same area, both can attempt to receive each mobile transmission and thus improve uplink signal quality by satellite diversity as disclosed in the aforementioned application that has been incorporated by reference. Thus, only mobiles that are not favorably disposed to be received by either satellite need to belong to the group that transmits every 4 timeslots.

It may also be noted that two-way conversation generally comprise a flow of speech traffic in only one direction at a time, thus the benefits of 16 versus 32-slot downlink usage should not be required by the same mobile at the same time as the benefits of 4 versus 8 slot uplink usage. Consequently, if a first mobile detects that it is receiving information on the downlink in every 16th slot, it indicates that a second mobile with which it is instantaneously paired is silent on the downlink and therefore probably active on the uplink. The first mobile should then only adopt the 8-slot uplink mode or be silent (DTXed). On the other hand, detecting in the first mobile that only one out of 32 timeslots was transmitted to it indicates that the downlink of the second mobile was also active and that transmission on every 1 out of 8 or 1 out of 4 uplink slots may be permitted. In thus way, uplink clashes are confined to those times when the downlink is the principal direction of speech activity.

Figure 7:
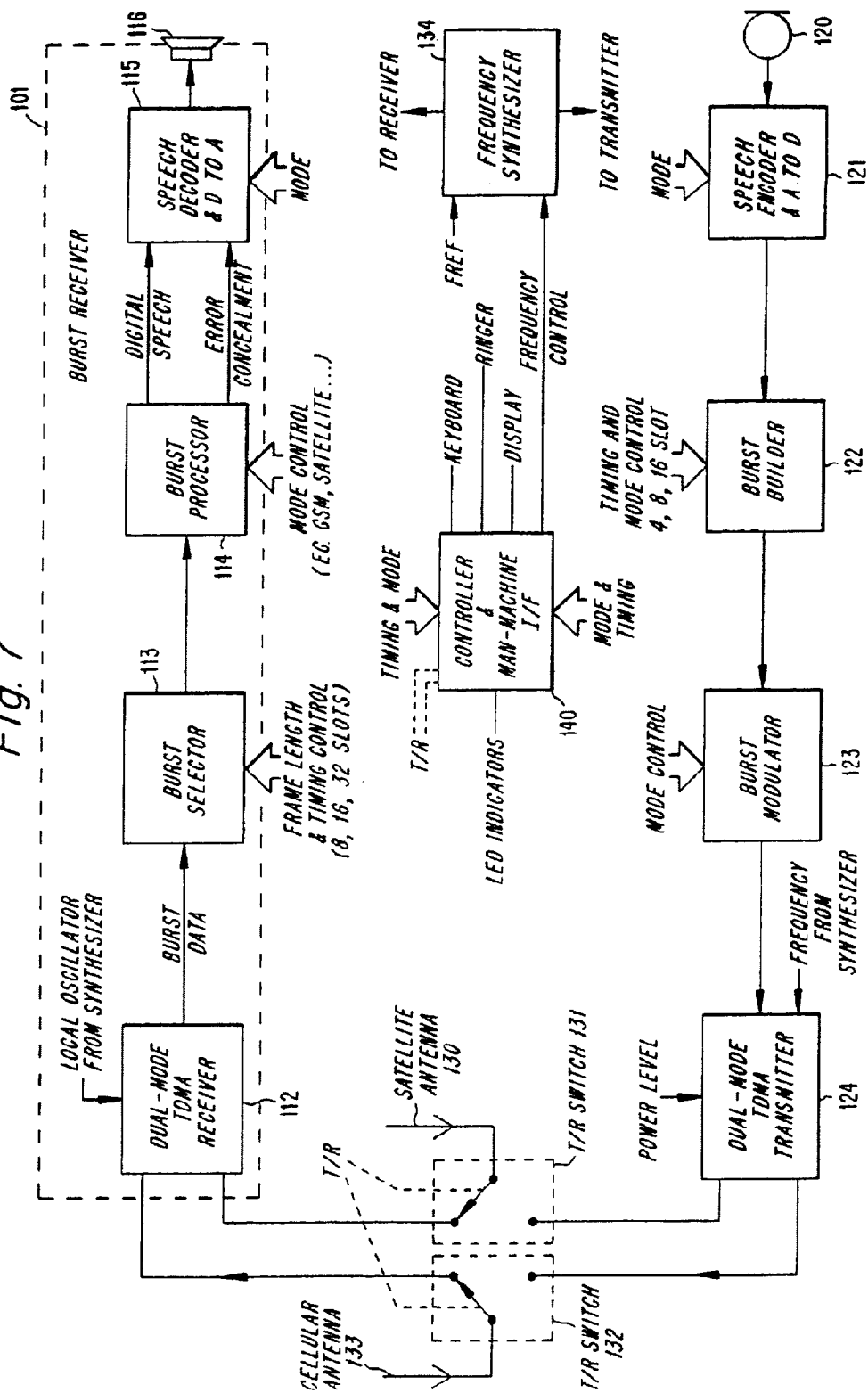
FIG. 7 illustrates a dual mode satellite/cellular terminal according to one embodiment of the present invention.

FIG. 7 shows a dual-mode satellite/cellular terminal suitable for use with the present invention. A dual-mode receiver 112 is capable of operating in either cellular or satellite frequency bands to downconvert and digitize received signals received in allocated timeslots. The burst selector 113 determines whether the received signal bursts are digitized every 8th burst or every 16th burst. It may, if 16-slot format has been specifically disabled by command from the network, only digitize every 32nd slot until further notice.

A burst processor 114 receives digitized bursts and processes them in either a GSM mode (8-slot, full-rate or 16-slot half-rate) or in a satellite mode (16-slot or 32-slot). Bursts are processed by correlating with known sync patterns to obtain channel coefficients for each burst. The channel coefficients are used to demodulate each burst to produce soft information bits having both polarity and quality attributes, where a zero-quality attribute signifies an erased or non-received data symbol. The soft information is de-interleaved to produce symbol blocks for decoding which are decoded using the associated soft information to produce speech segment data and error concealment information. Speech decoding in a speech decoder 115 converts the decoded speech blocks to an analog speech waveform in which noise or glitches due to non-received or misdecoded blocks have been bridged over by use of the error concealment information.

In the transmit direction, speech from a microphone 120 is digitized and coded in an encoder 121 in either a satellite mode at typically 4 KB/S or in a GSM mode at 13 KB/S. Digitized and source coded speech from the microphone 120 is fed to a burst builder 122 which includes error correction coding for the GSM mode and satellite mode. In the satellite mode, the same data is coded for transmission in even frames and odd frames. The burst builder mode is controlled by a central controller 140 to generate bursts with either the GSM or satellite bit-formats.

A burst modulator 123 receives burst data and modulates it onto a radio frequency carrier at either the GSM burst bitrate or in satellite mode at ¼ that bitrate for four times the burst length. The modulated carrier is upconverted to final frequency in a transmitter 124 with the aid of a local oscillator signal from a synthesizer 134.

A T/R switch 132 in the cellular mode or a T/R switch 131 in the satellite mode is controlled by the central timing controller 140 to connect an antenna to either the receiver 112 during burst reception or to the transmitter 124 during burst transmission. Although FIG. 7 shows separate antennas 130 and 133 for satellite respective cellular transmission, this is not meant to exclude the possibility of using a common antenna, or even a common T/R switch, frequency bands and other design considerations permitting.

Figure 8:
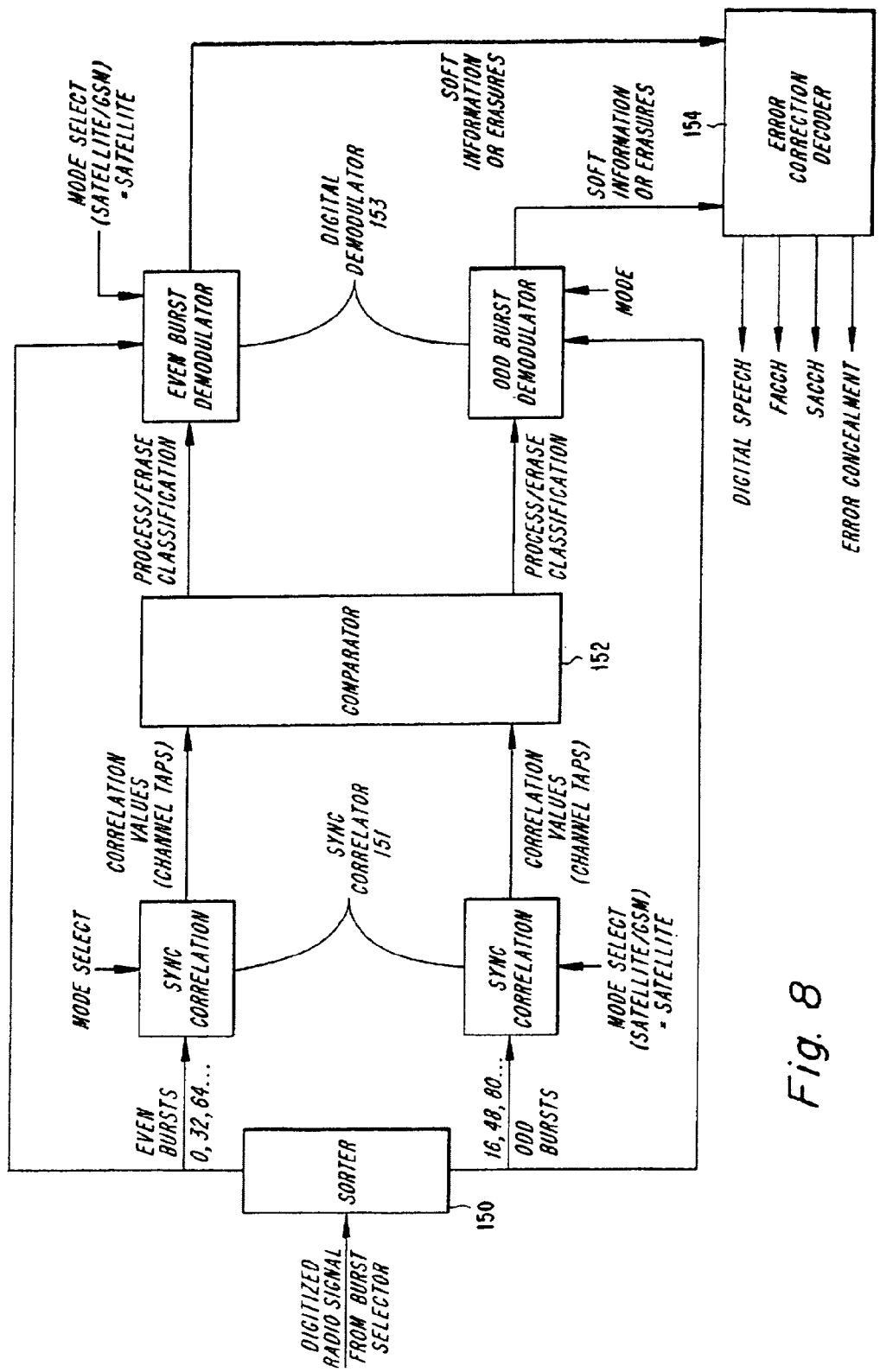
FIG. 8 illustrates a burst processing method for the satellite mode according to one embodiment of the present invention.

FIG. 8 shows the burst processing flow in satellite mode. The burst processing for the GSM mode is not shown as this is available in the prior art of GSM mobile telephones.

When every 16th slot is digitized from the receiver 112, a sorter 150 determines whether the burst shall be processed as an even frame/burst or as an odd frame/burst. This decision may amount to no more than examining the least significant bit of a 16-slot counter. Even frames are processed in a sync correlator 151 using the sync word that is expected in even frames. Odd frames are processed in the sync correlator 151 using the syncword expected in odd frames.

For a particular mobile, the odd and even syncwords can be the same and then the syncword for an another mobile that can use the same slots is chosen to be orthogonal. Alternatively, mobile A can use syncword 1 in even slots and synchword 2 in odd slots, while mobile B can use syncword 2 in even slots and syncword 1 in odd slots. The sync correlator 151 may always perform correlation with both syncwords and decide whether syncword 1 or 2 was transmitted. If the expected syncword is not that deemed to have been transmitted, that burst is deemed to have been erased. This decision can be made by comparing the magnitudes of the correlation values for synword 1 and syncword 2. The decision is taken to either process the burst in a demodulator 153 or not (erase). If the burst is deemed erased, the demodulator 153 produces soft information for the missing symbols having a zero quality attribute.

Note that although the sync correlator 151 and the burst demodulator 153 are shown as separate blocks in FIG. 8, they are preferably the same processing hardware running at different times (the even frame and the odd frame respectively). Soft-demodulated symbols (bits) have a polarity or symbol value and a quality attribute (the soft information). The value and the quality together constitute a soft symbol decision.

An error correction decoder 154 processes soft symbols to reconstitute either a speech block which may be erroneous due to missing or misdecoded blocks, or FACCH or SACCH messages. Error indications are provided for speech blocks to assist the subsequent voice decoder to reconstitute a speech waveform in which noise or distortion due to misdecoded blocks has been bridged over or concealed.

Figure 9:
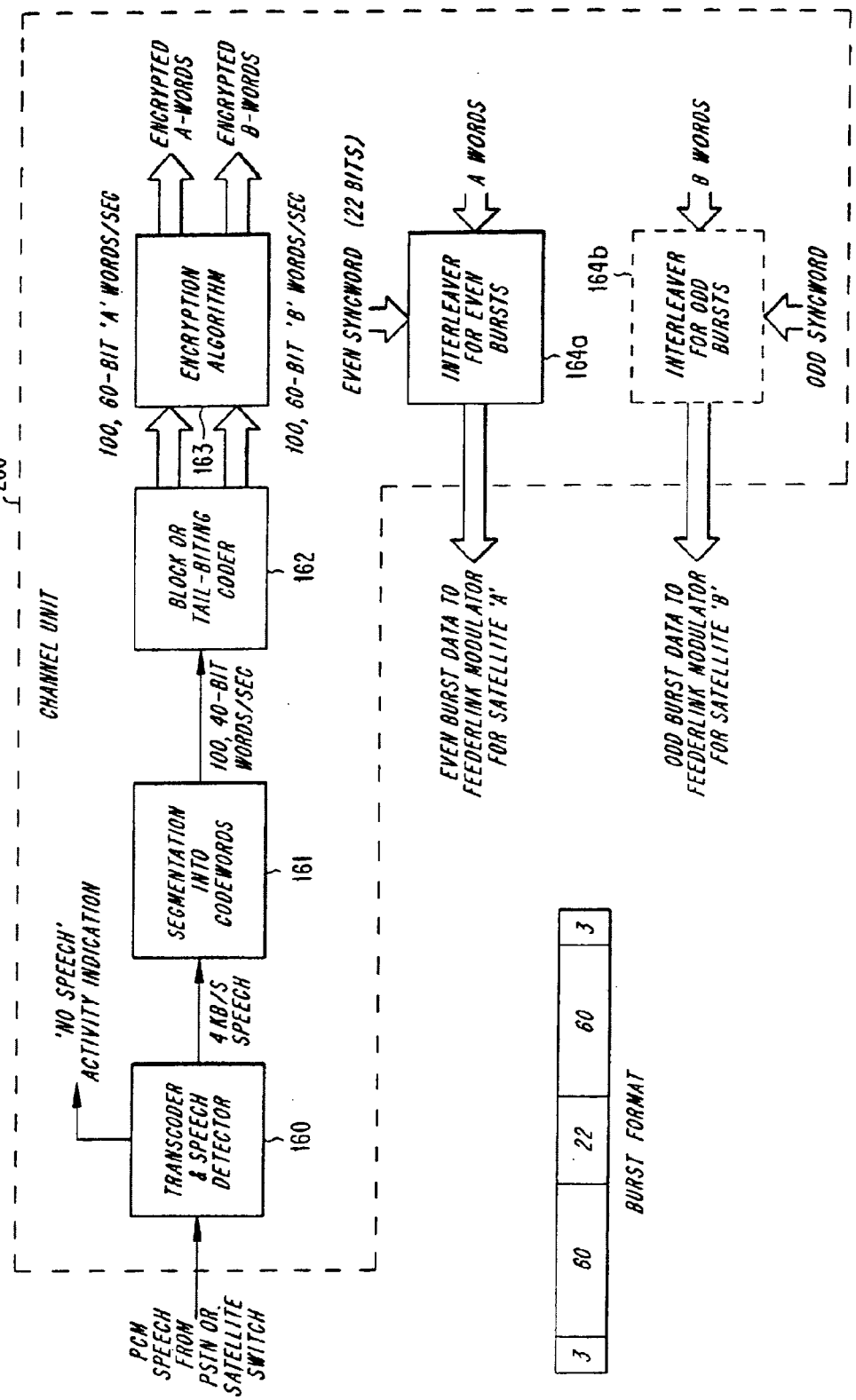
FIG. 9 illustrates a channel unit for satellite-to-mobile transmissions according to one embodiment of the present invention.

FIG. 9 shows a channel unit employed in a ground station for generating TDMA bursts for transmission to a mobile unit via a satellite or airborne relay station. Speech for transmission arrives from the PSTN via the satellite network switching center in the form of standard PCM. The PCM speech stream is processed in channel unit 200 to generate even and odd TDMA bursts that may be transmitted (or not) from either the same satellite (single-satellite diversity) or different satellites (two-satellite diversity). In either case, even bursts may be transmitted on the same frequency or a different frequency than odd bursts from the satellite relay to the mobile terminal.

The channel unit 200 comprises a transcoder 160 for processing PCM speech into a typically 4 KB/S rate for satellite transmission. It also produces a speech activity indication the uses of which will be described later in the description of FIGS. 15 and 16.

A segmenter 161 groups speech bits into codewords for transmission and may use knowledge of which coded bits are more perceptually significant than others to effect an optimal grouping. For example, bits can be grouped into a 40-bit block for transmission every 10 mS in such a way that failure to receive any one block does not erase all the important bits for reconstituting a speech waveform, but allows adjacent blocks to be used to fill in missing information with the aid of an error concealment algorithm.

Each 40-bit block is coded using an error-correction coder 162 into two 60-bit blocks in such a way that reception of either 60-bit block alone is sufficient to reconstitute the 40-bit block, while reception of both allows reconstruction of the 40-bit block under more adverse signal-to-noise-ratio conditions. The 60-bit blocks are separately enciphered using a secret key for the mobile subscriber in question in cipher unit 163. In a communications system, ciphering can take place at various levels in the infrastructure, but ciphering bits just before modulation on to the radio carrier, i.e., after error correction coding, has the advantage that non-intended co-channel signals produce interference that is better filtered out by the error correction decoding process, and so is preferred. If an encryption algorithm 163 operates by modulo-2 addition of a keystream, it must encipher the A and B-word outputs using different keystream bits to preserve security. Thus 120 keystream bits are produced by algorithm 163 every 10 milliseconds for this purpose.

Encrypted 60-bit A-words are interleaved by interleaver 164 over two successive even TDMA frames using block diagonal interleaving to reduce delay. That means that two 60-bit A-words produced for the previous two 40-bit speech segments are split between the previous and current even burst while two 60-bit A-words corresponding to two current 40-bit segments are split between the current burst and the next burst, giving always 120 bits transmitted per burst. The interleaving pattern for coded speech, bits skips over the SACCH burst which occurs every 13th frame and so speech is interleaved into 12 out of the 13 frames in the traffic superframe structure. The interleaving pattern is preferably chosen carefully with regard to the particular characteristics of the speech decoder and perceptual error concealment algorithm.

Encrypted 60-bit B-words are similarly interleaved using interleaver 164b into odd-frame bursts. Even-frame bursts are fed to an uplink modulator for the A-satellite and odd-frame bursts are fed to an uplink modulator for the B-satellite, if two-satellite diversity is employed. Both odd and even bursts can alternatively be modulated on a feederlink up to the same satellite (single satellite diversity). In both cases the burst format includes a 22-bit syncword inserted in between two 60-bit interleaved A- or B-words by the interleaver 164a or 164b, and includes tail bits as well as guard (up-down ramping) time at the beginning and end.

Figure 10:
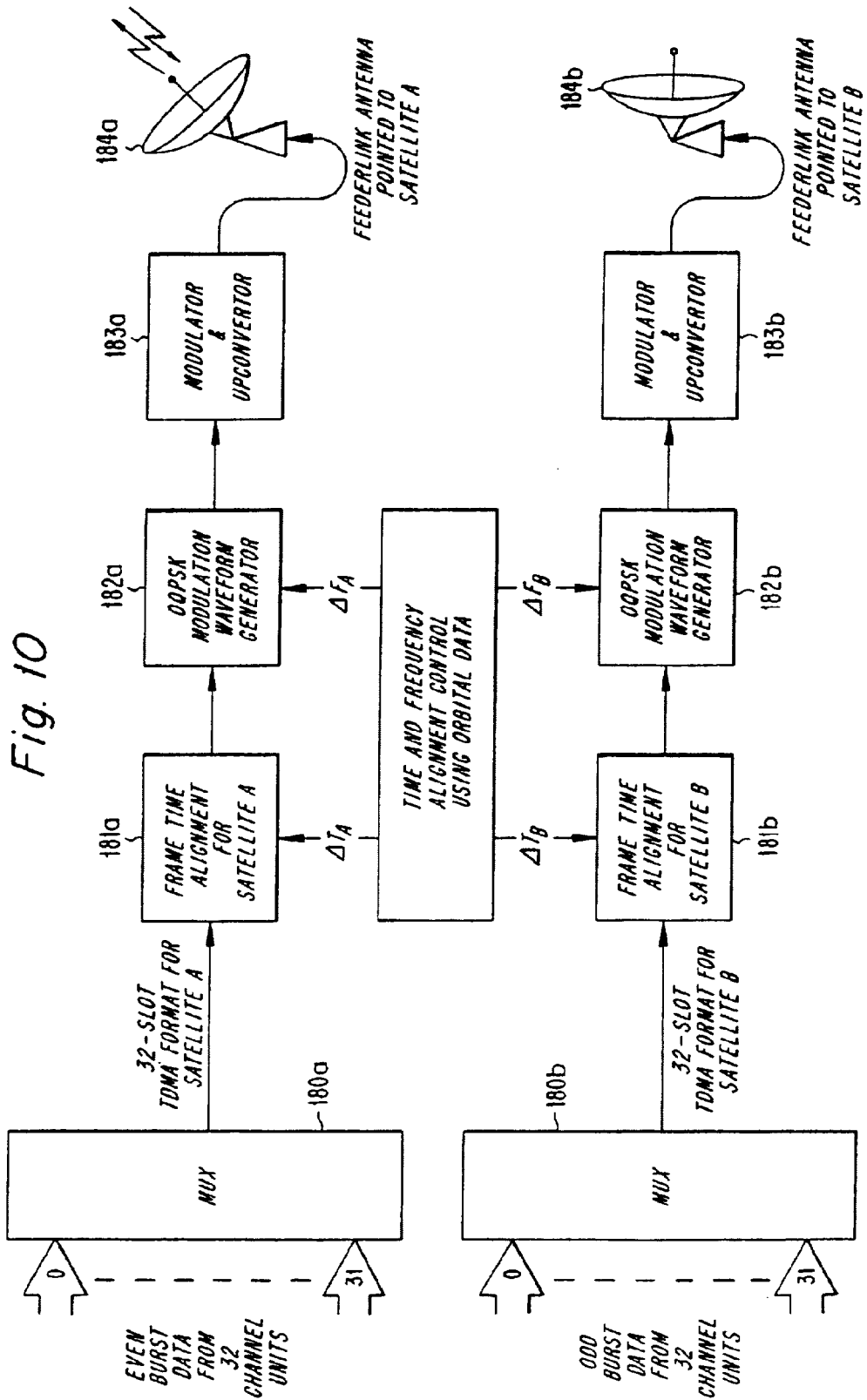
FIG. 10 illustrates a ground station according to one embodiment of the present invention.

More details of a ground station suitable for exploiting two-satellite diversity are shown in FIG. 10. Even data bursts are collected from 32 channel units 200 and multiplexed for transmission on to the same TDMA carrier frequency using a multiplexer 180*a*. Odd data bursts are similarly collected using a multiplexer 180*b*. When the multiplexer 180*a* and the multiplexer 180*b* collect respectively an even burst and an odd burst from the same channel unit 200, then that channel is operating in 16-slot or diversity mode.

Different delays are experienced to mobile units when a signal is relayed through different satellites to the same cell or sub-region on the ground. Time alignment units 181*a* and 181*b* operate to approximately equalize the delays so that mobile units receive even and odd frames approximately equispaced in time. Different satellite relays may also have different velocities to or away from the commonly illuminated sub-region, leading to different Doppler frequency shifts.

OQPSK modulation waveform generators 182*a* and 182*b* convert modulating data to modulated waveforms and can include means to pre-correct transmission frequency to compensate for the predictable Doppler shift. The frequency correction can either be performed on a cell, beam or sub-region basis, being exact for the center of the region, or can be performed on a per mobile link (per timeslot) basis so that every mobile experiences a signal exactly corrected for the Doppler shift experienced at its particular location. The time and frequency aligned, modulated signals are applied to an upconvertor 183*a* for transmission via an antenna 184*a* to satellite A or to an upconverter 183*b* for transmission via an antenna 184*b* to satellite B.

Figure 11:
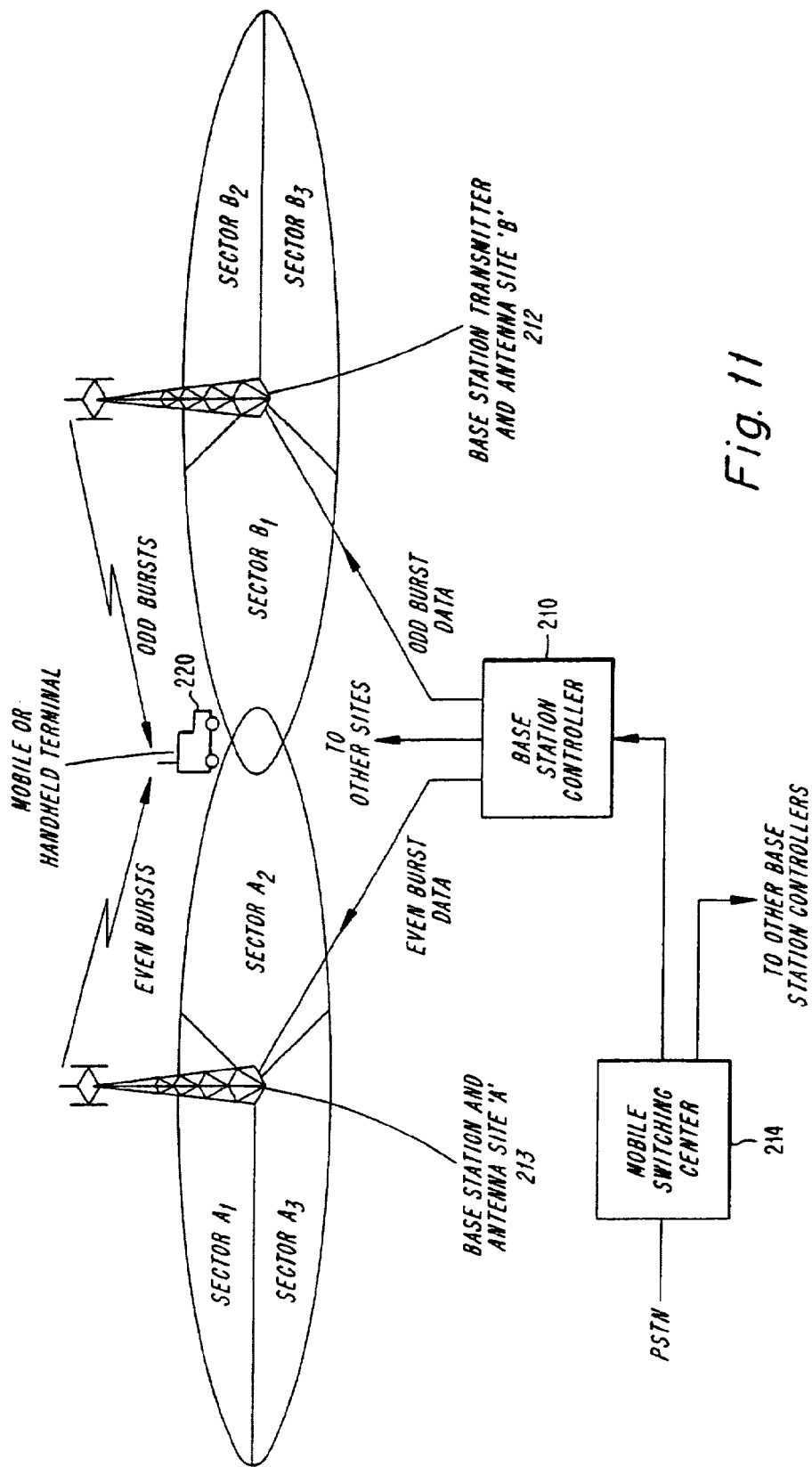
FIG. 11 illustrates macrodiversity used in a cellular network according to one embodiment of the present invention.

FIG. 11 shows application of the inventive diversity scheme to a network of cellular base stations. A base station controller 210 controls transmissions from a number of cellular sites 213 and 212. Each site may include a sectorized antenna for dividing the area serviced from the site into three 120-degree sectors A1,A2,A3 for site 213 and B1,B2, B3 for site 212. A base station controller 210 receives traffic from a mobile switching center 211 for transmission to a mobile unit 220, for example, which may lie on the border between two service areas and may be accessed more or less equally via a transmission in sector A2 of site 213 or sector B1 of site 212. Consequently the base station controller can direct site 212 to transmit even frame bursts in sector A1 and odd frame bursts in sector B2. The base station controller 210 may be located at either site 213 or site 212 or another site, or may be collocated with the mobile switching center 211. Base station controllers may preferably be distributed to every site and may assume a master or a slave roll to another base station controller for supporting communication to a particular mobile. A mobile may thus be served (using only even frames for example) only by a master BSC, or when in a border area may be served with both even and odd frames transmitted from a master and a slave BSC respectively, and after passing through the border region the slave BSC may become the new master BSC transmitting only odd frames, thus completing a soft handover, or "make-before-break" handover.

Figure 12:
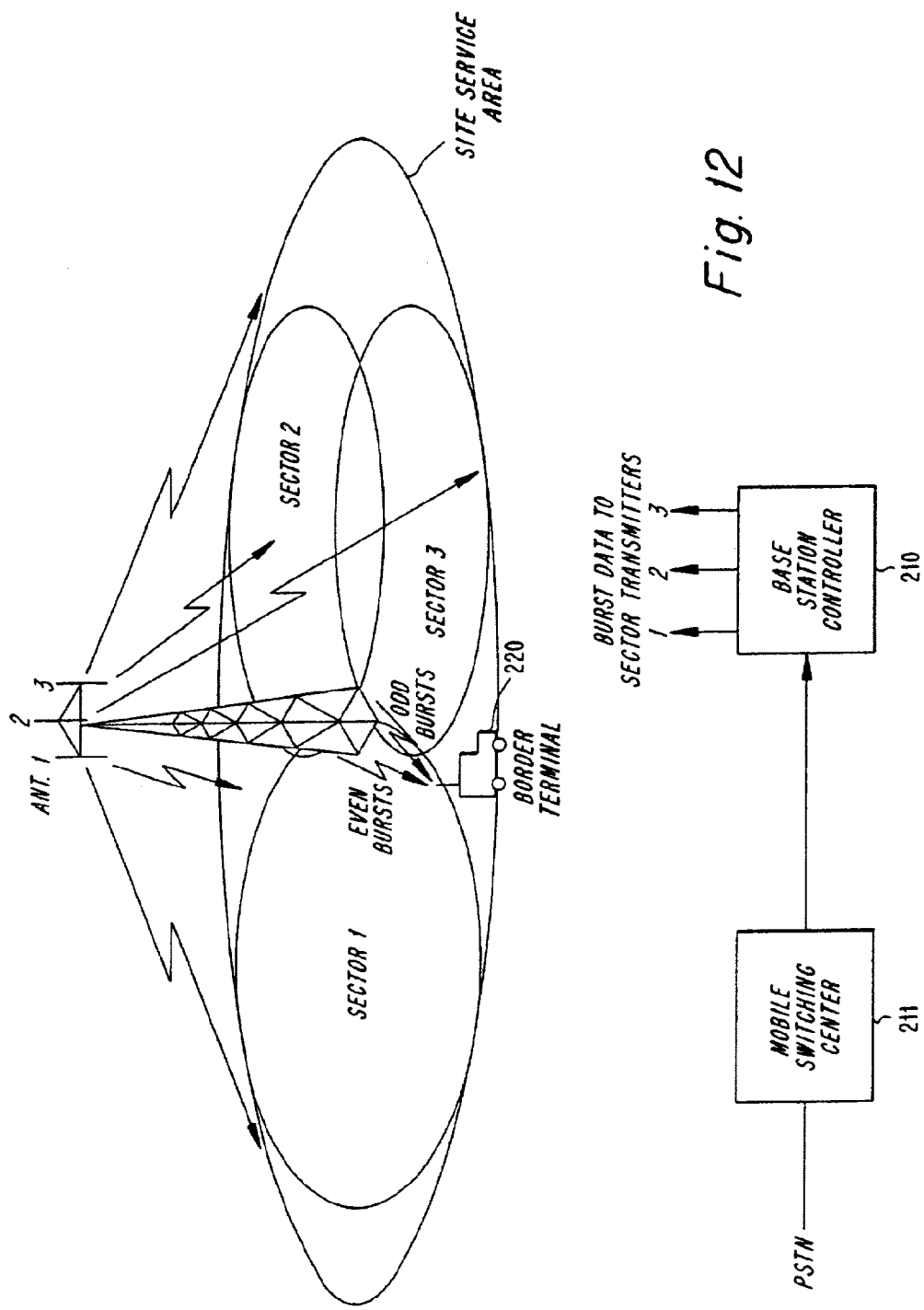
FIG. 12 illustrates sector diversity for mobile stations on sector borders according to one embodiment of the present invention.

FIG. 12 illustrates that make-before-break handover between sectors of the same site may be implemented using the inventive adaptive frame formats. The make-before-break handover may also apply to the uplink, as the mobile unit 220 may also have the capability to transmit both even and odd frames while in the handover zone between sites, cells or sectors.

Figure 13:
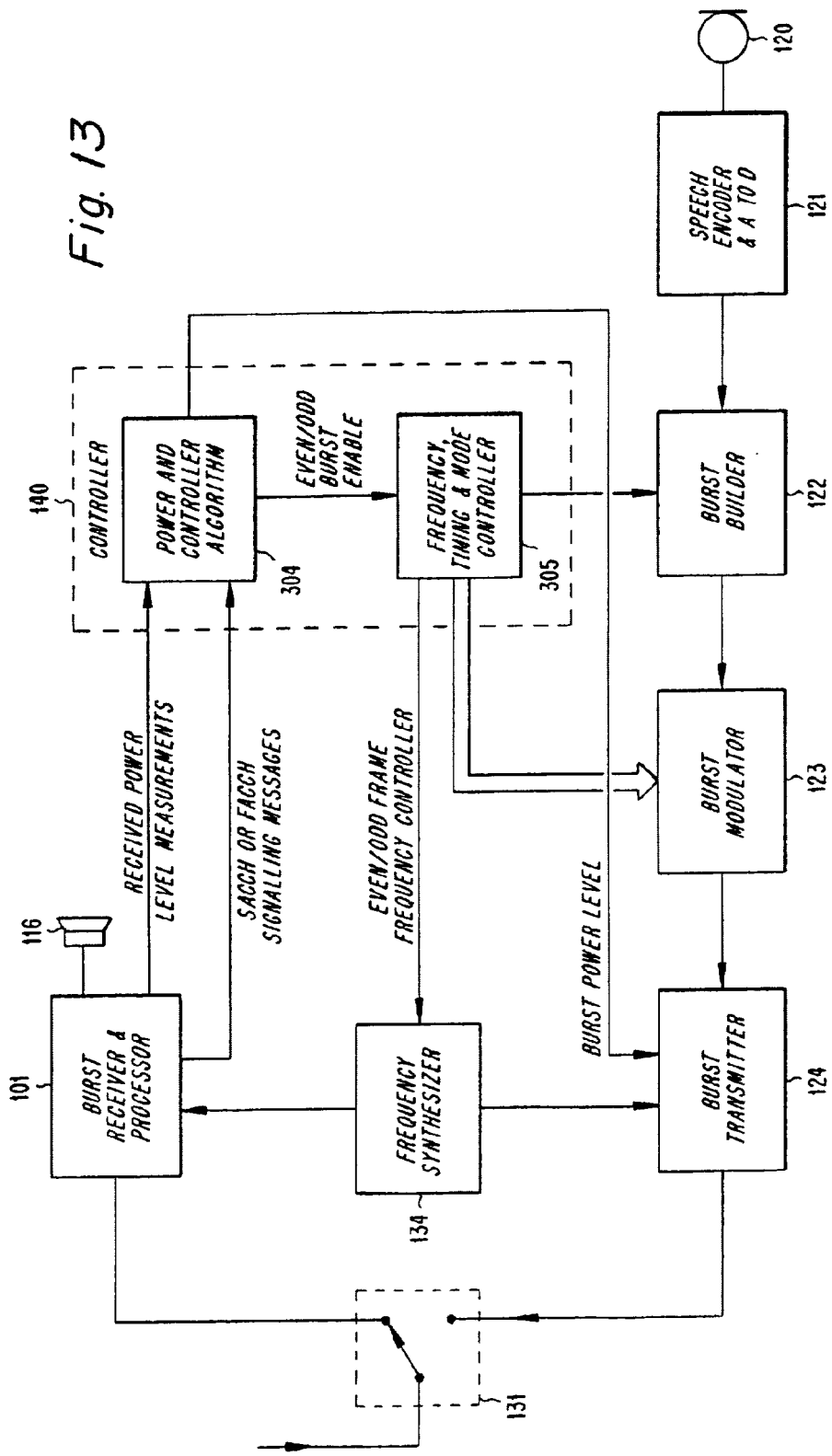
FIG. 13 illustrates a terminal employing adaptive power control according to one embodiment of the present invention.

When a mobile transmits both even and odd frames it is transmitting in principle twice the energy for the same peak power, a 3 dB increase. FIG. 13 shows the inventive adaptive power control algorithm in a mobile terminal based on achieving the top 3 dB of power control range by adaptively transmitting either even frames or odd frames alone, or by transmitting both even and odd frames.

Burst receiver 101 receives even and odd frames as previously described and processes them to reconstitute speech to earpiece 116. In addition, a measurement of received signal power computed using the last received burst deemed to be an "intended" burst is provided to the power control algorithm portion of a controller 303. As will be appreciated by a person skilled in the art, a power control algorithm 304 may comprise a software routine within the controller 303 adapted to execute the power control function in a time-shared processor performing other functions at different times. The power control algorithm 304 also receives signalling messages of either SACCH or FACCH type that are indicated to be power control messages. The algorithm 304 processes the message information together with the power measurements to determine a power level for transmitting the next transmit burst. If the power level is between the maximum power and 3 dB lower, the next burst will be transmitted at a corresponding power between 0 and 3 dB lower than maximum. If the power level is more than 3 dB lower than maximum, the next burst (e.g. odd burst) will not be transmitted providing the previous (e.g. even) burst was transmitted. The following burst will then be transmitted at the determined power level +3 dB to compensate for the untransmitted odd burst. The foregoing is a simplified general description of the algorithm to clarify the concept. In practice, the power level determination can include a more exact determination of the effect of transmitting or not transmitting prior bursts on the decoding of each 40-bit speech segment, given the known interleaving pattern, and the transmission or not and the power level of the current burst may be decided based on the power levels of bursts transmitted in the past that affected the same speech segments.

The decision to transmit an even or odd burst is passed from the power control algorithm 304 to a frequency, timing and mode controller 305. This selects the frequency and timing of a burst that has been decided to be transmitted, including providing a tuning code to synthesizer 306 to set the transmission frequency.

Figure 14:
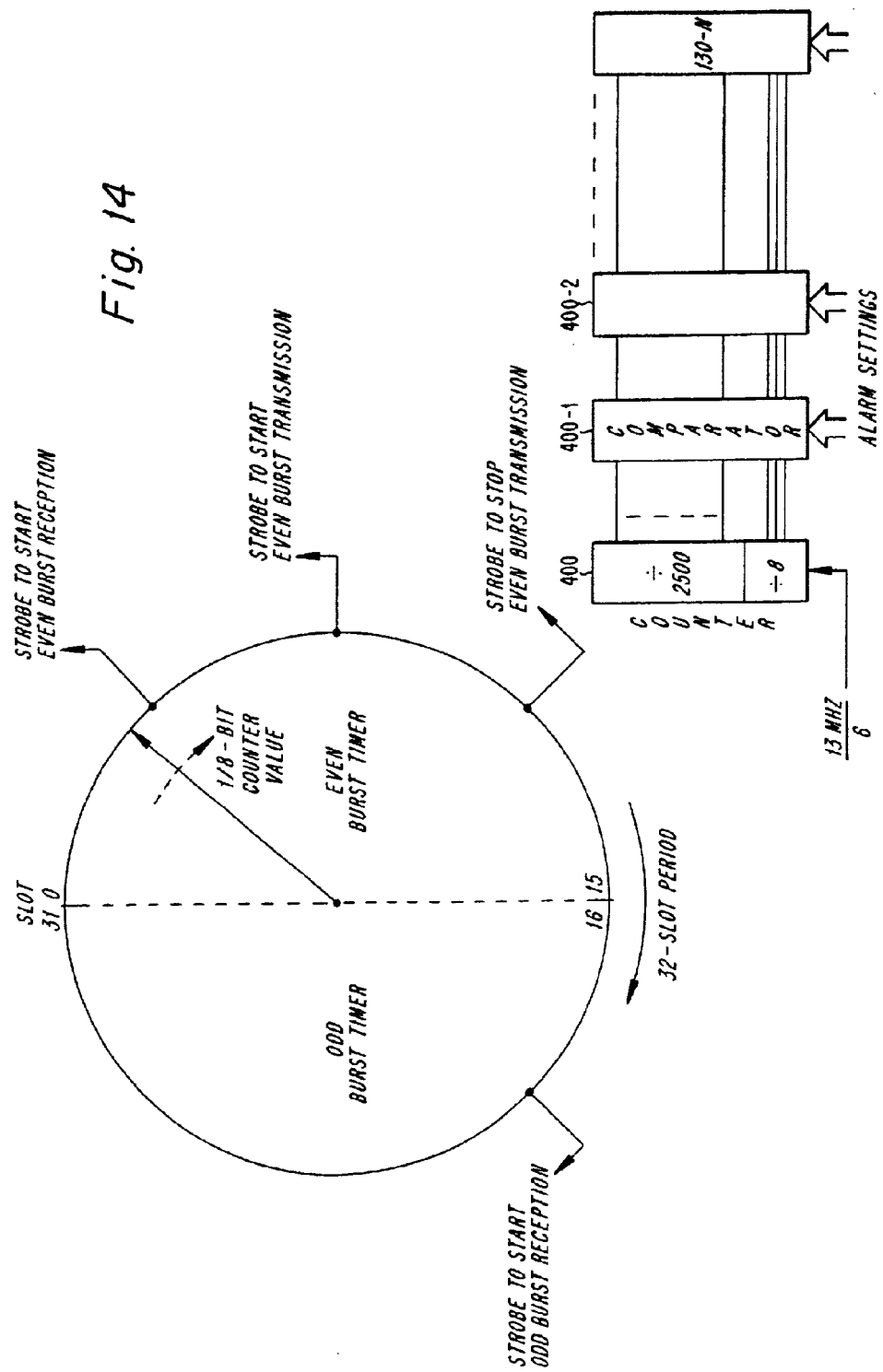
FIG. 14 illustrates an even/odd frame synchronizer according to one embodiment of the present invention.

FIG. 14 shows the operation of a timing controller within unit 305. The cyclic 32-slot TDMA period is illustrated as a circle starting at slot 0 and ending at slot 31. A counter 400 counts a reference clock frequency of for example 8 times the downlink bitrate to generate the 32-slot cycle. The circle is divided into a first 16 slots and a second 16 slots. A number of "alarm settings" are distributed around the circle and are triggered when the counter 400 reaches predetermined values to generate hardware strobe signals. For example, a strobe signal can be generated to start receiver 402 digitizing an even burst. A second strobe signal nominally but not exactly 180 degrees around from the first strobe can start digitizing an odd burst. In between receive bursts strobes are generated to start and stop transmission of bursts.

Each strobe is generated by a comparator (130-1, 130-2 ... 130-N) that is set to detect a preprogrammed count lying either in the even-frame half of the cycle or the odd-frame half. The comparators are programmed by controller 403 to set the time at which each desired strobe shall be produced. In this way timing synchronization may be maintained and updated separately for the even and odd bursts to operate with two different satellites or base stations having different frame timings.

Figure 15:
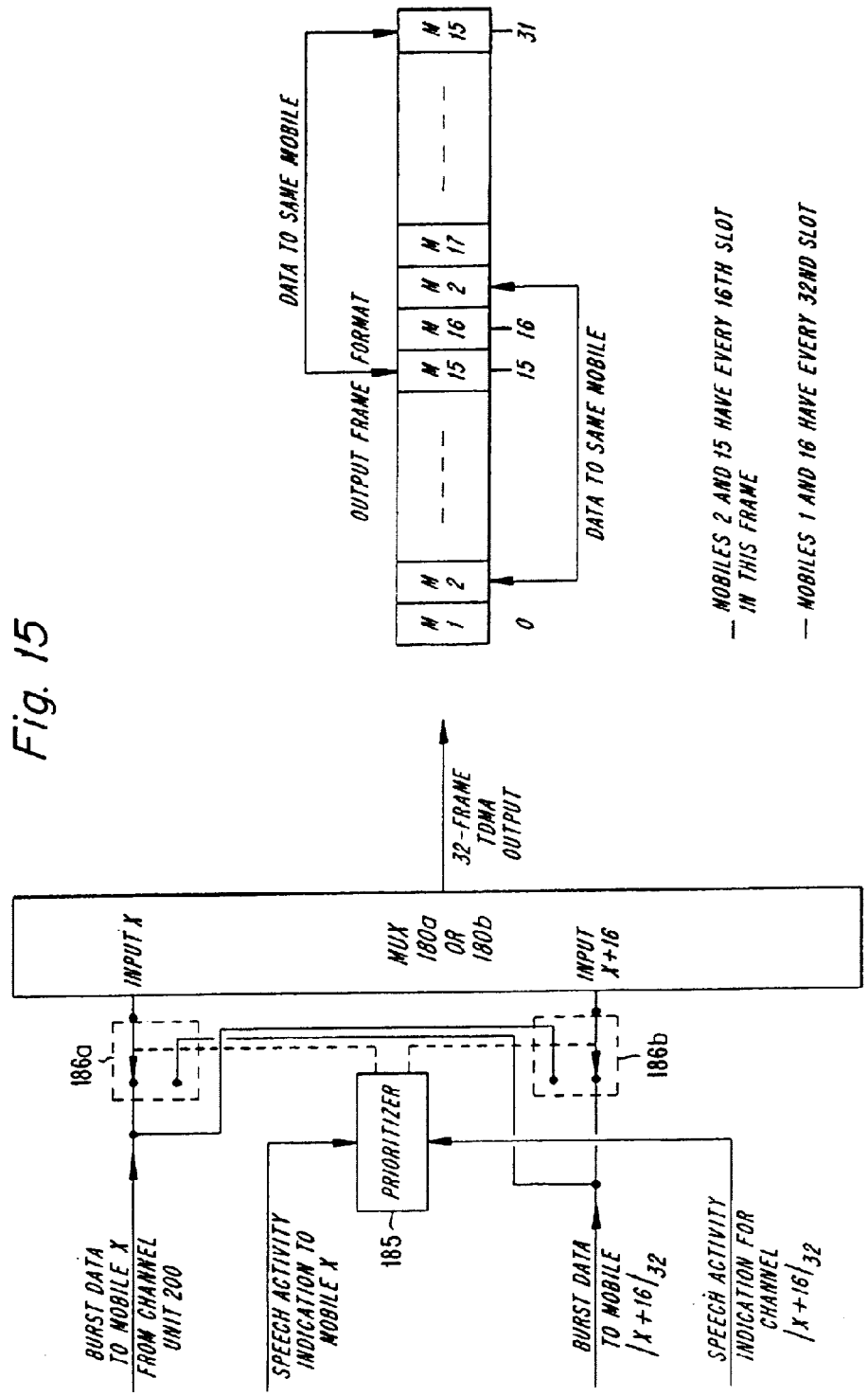
FIG. 15 illustrates adaptive TDMA formatting according to one embodiment of the present invention.

FIG. 15 illustrates a means by which ground stations can adaptively transmit either even or odd bursts or both. The motivation for the ground station is not so much power control, but rather availability of the slot. If both an even and odd slot are available to use for transmitting to a mobile unit that can receive both with equal quality on average, it is always better to transmit both and reduce the power level-if desired. When both are transmitted, the power level may be reduced by 3 dB while keeping the energy used the same, but due to the extra coding gain in receiving 120 coded bits per 40-bit speech segment, and the diversity gain obtained by spreading the 120 bits over two even and two odd bursts or frequencies, the energy required for the same segment error probability is also reduced. Thus there is a saving in total satellite power per mobile link in using both odd and even bursts if available.

Even when one mobile occupies even bursts and another occupies odd bursts, both may be used by one mobile whenever the other is silent. The speech activity indication from transcoder 160 of channel unit 200 of FIG. 9 accompanies the speech data for that mobile link to multiplexer 180a or 180b. The speech activity indications for mobiles using respectively an even slot and a corresponding odd slot are processed in a prioritizer 185 to determine which mobile gets to use each slot. Traffic for Mobile X, for example, is given priority to use slot X where X is between 0 and 15. Traffic for mobile x+16 (modulo-32) is given permission to use slot X if traffic for mobile X has a no-speech activity indication and traffic for mobile X+16 has a positive speech activity indication. The prioritizer 185 translates this into a control signal for a switch 186a to select traffic signal X+16 to input X of multiplexer 180a or 180b in place of traffic signal X+16. Conversely, the prioritizer 185 controls switch 186b to select traffic signal X to mutliplex input X+16 when signal X+16 has a negative speech activity and signal X has a positive activity indication. If both are positive, they only use their respective slots X for signal X and X+16 for signal X+16, and if both are negative no signal is transmitted in either slot (DTX). When a signal is allowed to be transmitted in both an odd and an even slot, the power level used may be halved compared to the level that otherwise would have been used for single-slot transmission, but this decision is related to choice of downlink power control algorithm and whether frequency hopping is employed or not. The prioritizer 185 together with switches 186a, 186b therefore operate to attempt to keep the multiplexer capacity filled with traffic to one or other mobile unit.

FIG. 10 illustrates ground station multiplexing operating in conjunction with frequency hopping. Frequency hopping within a cell or beam radiated by a satellite involves random exchanges of frequency between the different satellite-to-mobile links that are using the same timeslot, but on different carrier frequencies. For example, if a beam or cell contains 256 separate conversations, then 8 downlink carriers of 32 slots each are in use. Mobile links 0,32,64,96 .... 224 can be denoted to use slot zero on carriers 0,1,2 .... 7 while mobile links 1,33,65 ... 225 use slot 1 and so forth. However, the allocations of one of the unique carrier frequencies 0 to 7 to mobiles 0,32,64 ... 224 can change from frame to frame according to a frequency hopping algorithm. An algorithm that still guarantees each link a unique frequency without clashes at least within the same cell is called Orthogonal Frequency Hopping.

Figure 16:
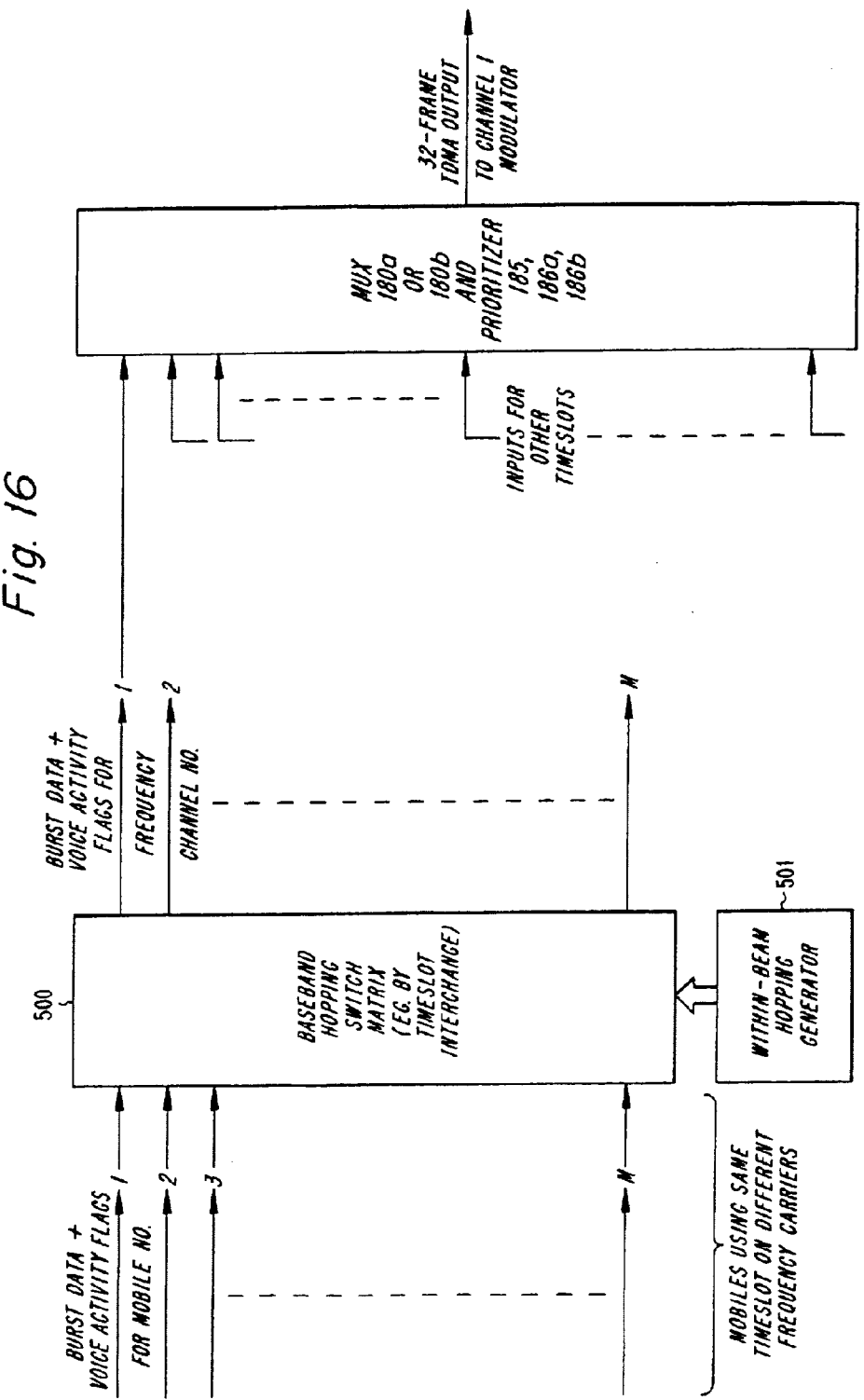
FIG. 16 illustrates baseband frequency hopping associated with adaptive formatting according to one embodiment of the present invention.

Orthogonal Frequency Hopping may be effected either by changing a frequency synthesizer for each mobile link from frame to frame, or alternately by the baseband hopping scheme of FIG. 16 in which the traffic stream for a particular mobile is switched from frame to frame to a different, fixed frequency carrier modulator by means of baseband hopping switch matrix 500. The inputs to switch matrix 500 are the data bursts for mobile links 1 to M for the same timeslot on M different carriers. Control signals from orthogonal frequency-hop generator 501 steer each traffic signal to a unique output corresponding to carrier frequencies 1 to M, but the steering effects a different mapping for each successive TDMA frame of 32 slots. The speech activity indication accompanying each data burst is also routed to the selected output. The outputs from other baseband hopping units 500 to 501 for different timeslots destined for the same carrier frequency but different timeslots are collected at the inputs of multiplexer 180a or 180b. FIG. 16 only shows for clarity the multiplexer for frequency channel 1. It is implicit that there would be similar multiplexers each complying with the entire block diagram of FIG. 15 for other carrier frequencies. The multiplexer 180a has an associated prioritizer 185 and switches 186a and 186b that will allocate a given signal prioritized for slot X slot number X+16 also providing that the signal prioritized for slot X+16 temporarily has a negative voice activity indication. Due to the frequency hopping selector 500, the signal in slot (X+16) that is paired with a signal in slot X is no longer the same one but varies randomly from frame to frame thanks to the operation of hopping generators 501 for slot X and slot (X+1) being programmed to generate different random frequency selections. This is in contrast to the frequency hopping disclosed for GSM, in which mobiles that are allocated different slots on the same carrier hop together. By this means each mobile gets to transmit both an even and an odd slot 50% of the time due to being paired randomly from frame to frame with mobiles that may have positive or negative speech activity indications with 50% probability.

The above invention use of dynamic TDMA slot allocation combined with demodulation and decoding that can automatically detect whether received information was intended or not and discard it or use it accordingly has many advantages as have been described in the above specification but which are meant to be exemplary and not limiting of the scope of the invention which is defined by the following claims.

What is claimed is:

1. A dual mode transceiver comprising:
 a linear modulation receiver adapted to receive linearly modulated TDMA signals from a first remote station over a first TDMA downlink channel having a given bandwidth, said linear modulation receiver being operative to receive constant envelope modulated TDMA signals from a second remote station over a second TDMA downlink channel having the same given channel bandwidth, wherein the constant envelope TDMA signals are an approximation of said linearly modulated TDMA signals, and wherein the first and second TDMA downlink channels have time slots of equal duration and include the same number of bits; and
 a transmitter that transmits constant envelope modulated TDMA signals over an uplink channel to said first and second remote stations.

2. The dual mode transceiver of claim 1 wherein said first remote station is a satellite relay station.

3. The dual mode transceiver of claim 2 wherein said second remote station is a terrestrial base station.

4. The dual mode transceiver of claim 1 wherein said constant envelope modulated TDMA signals are Gaussian Minimum Shift Keyed (GMSK) modulated signals.

5. The dual mode transceiver of claim 1 wherein said linearly modulated TDMA signals are Offset Quadrature Phase Shift Keying (OQPSK) signals.

6. The dual mode transceiver of claim 1 wherein the frame period of the first TDMA downlink channel is longer than the period of the second TDMA downlink channel.

7. The dual mode transceiver of claim 6 wherein the linearly modulated TDMA signals are received in periodic time slots with a first spacing, and wherein said constant envelope modulated TDMA signals are received in periodic time slots with a second spacing less than said first spacing such that the average bit rate of the linearly modulated TDMA signals is less than the average bit rate of the constant envelope modulated TDMA signals.

8. A method of transmitting and receiving signals at a dual mode transceiver:
    receiving linearly modulated TDMA signals from a first remote station over a first TDMA downlink channel having a given bandwidth with a linear modulation receiver configured to receive linearly modulated TDMA signals;
    receiving constant envelope modulated TDMA signals form a second remote station over a second TDMA downlink channel having the same given bandwidth with said linear modulation receiver, wherein the constant envelope TDMA signals are an approximation of said linearly modulated TDMA signals, and wherein the first and second TDMA downlink channels have time slots of equal duration and include the same number of bits; and
    transmitting constant envelope modulated TDMA signals to the first and second remote stations.

9. The method of claim 8 wherein said first remote station is a satellite relay station.

10. The method of claim 9 wherein said second remote station is a terrestrial base station.

11. The method of claim 8 wherein said constant envelope modulated TDMA signals are Gaussian Minimum Shift Keyed (GMSK) modulated signals.

12. The method of claim 8 wherein said linearly modulated TDMA signals are Offset Quadrature Phase Shift Keying (OQPSK) signals.

13. The method of claim 8 wherein the frame period of the first TDMA downlink channel is longer than the period of the second TDMA downlink channel.

14. The method of claim 13 wherein the linearly modulated TDMA signals are received in periodic time slots with a first spacing, and wherein said constant envelope modulated TDMA signals are received in periodic time slots with a second spacing less than said first spacing such that the average bit rate of the linearly modulated TDMA signals is less than the average bit rate of the constant envelope modulated TDMA signals.

* * * * *